(12) United States Patent
Nakagome et al.

(10) Patent No.: US 8,272,773 B2
(45) Date of Patent: Sep. 25, 2012

(54) ILLUMINATING DEVICE AND DISPLAY DEVICE

(75) Inventors: Tomohiro Nakagome, Tokyo (JP); Luis Manuel Murillo-Mora, Tokyo (JP); Yu Ookubo, Tokyo (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 13/335,702

(22) Filed: Dec. 22, 2011

(65) Prior Publication Data

US 2012/0092891 A1    Apr. 19, 2012

Related U.S. Application Data

(63) Continuation of application No. PCT/JP2010/061907, filed on Jul. 14, 2010.

(30) Foreign Application Priority Data

Jan. 15, 2010 (JP) .................................. 2010-006486
Apr. 27, 2010 (JP) .................................. 2010-101892

(51) Int. Cl.
*F21V 7/04* (2006.01)

(52) U.S. Cl. ........ 362/616; 362/612; 362/613; 362/628; 349/65; 385/31

(58) Field of Classification Search .................. 362/616, 362/612, 628; 385/31; 349/65
See application file for complete search history.

(56) References Cited

OTHER PUBLICATIONS

Notice of Submission of Argument for Application No. 10-2011-7018529, mailed Sep. 16, 2011, 5 pgs.
Translation of Notice of Submission of Argument for Application No. 10-2011-7018529, mailed Sep. 16, 2011, 12 pgs.

*Primary Examiner* — Joseph L Williams
(74) *Attorney, Agent, or Firm* — Squire Sanders (US) LLP

(57) ABSTRACT

An illuminating device acceding to the present invention has light sources, a light guide body which emits lights incident from the light sources, and a blurring structure, and, on the surface opposing to the emission surface of the light guide body, the light deflection elements which guide lights incident from the light sources toward the emission surface are formed regularly in two-dimensional direction of the first direction and second direction. The blurring structure has a function of blurring the light deflection elements regularly formed in the two-dimensional direction, and this blurring structure converts incident lights into linear lights inclined in the direction of the angle θ with respect to the first direction.

18 Claims, 31 Drawing Sheets

(a)

(b)

(a)

(b)

ILLUMINATING DEVICE AND DISPLAY DEVICE

CROSS REFERENCE TO RELATED APPLICATION

This application is a continuation of International Application No. PCT/JP2010/061907, filed on Jul. 14, 2010, the entire contents of which are incorporated herein by reference.

BACKGROUND OF THE INVENTION

1. Field of the Invention

The present invention relates to an illuminating device which has a light guide body and a blurring structure used to control illuminating light paths, and a display device.

2. Description of Related Art

Large-size liquid crystal televisions and flat display panels in recent years mainly adopt illuminating devices of a direct-lit type, and illuminating devices of an edge-lit type. With the illuminating device of the direct-lit type, a plurality of cold-cathode tubes which are light sources and LEDs (light emitting diodes) are regularly arranged in the back surface of the panel. A diffusing plate with high light scattering performance is used between an image display element such as a liquid panel and light sources, such that cold-cathode tubes which are light sources and LEDs are not seen.

By contrast with this, with the illuminating device of the edge-lit type, a plurality of cold-cathode tubes and LEDs are arranged on end surfaces of a translucent plate which is referred to as "light guide plate". Generally, on a surface (light deflection surface) on the opposite side of an emission surface of the light guide plate (a surface opposing to an image display element), light deflection elements are formed which efficiently guide incident lights which are incident from the end surfaces of the light guide plate, to the emission surface. Various light deflection elements formed on the light deflection surface are proposed including light deflection elements which are formed by printing a white dot pattern and light deflection elements which have lens shapes in order to efficiently guide light to the emission surface.

However, with the edge-lit type, the number of light sources to be disposed is limited due to a structure in which light sources are arranged only on the end surfaces of the light guide plate. Hence, when a liquid crystal display device becomes larger, it is difficult to brighten the entire display, and therefore an optical sheet which enhances the brightness plays an important role.

As means for enhancing the brightness of the liquid crystal display screen, a brightness enhancement film (BEF) which is the registered trademark of 3M company in the U.S.A. is widely used as a lens sheet.

FIG. 28 to FIG. 30 illustrate brightness enhancement films disclosed in Japanese Patent Application Publication No. 1-37801 and Japanese Patent Application Laid-Open No. 6-102506. In FIG. 28, a planar light source 182, a BEF 185 which is a brightness enhancement film on which light emitted from the light source 182 is incident, and a liquid crystal panel 184 are schematically disposed. As illustrated in FIG. 18, the BEF 185 is an optical film in which unit prisms 187 having a sectional triangular shape are aligned on a transparent base material 186 periodically in one direction. These unit prisms 187 are formed in a larger size (pitch) than the wavelength of light.

The BEF 185 can condense light from "off-axis", and redirect or "recycle" this light "on-axis" toward the viewer. That is, the BEF 185 can increase an on-axis brightness by decreasing an off-axis brightness when a liquid crystal display device is used (viewed). "On-axis" refers to a direction matching with a field-of-view direction F' of the viewer in FIG. 28, and generally refers to a normal direction side with respect to the display screen of the liquid crystal panel 184.

Further, when a lens sheet represented by the BEF 185 is used, it is possible to prevent unevenness of lights emitted from the light guide plate by arranging a diffusion film to which a diffusion filler is coated on the transparent base material, between the light guide plate and lens sheet.

Furthermore, when the diffusion film is arranged between the lens sheet and liquid crystal panel, it is possible to reduce side lobes of emission lights caused by the prism sheet, and prevent a moire interference pattern produced between the regularly aligned lenses and liquid crystal pixels.

By the way, the light guide plate used for the edge-lit type has a light deflection surface opposite to the emission surface as described above and, on the light deflection surface, light deflection elements of a white dot pattern, microlenses (concave type or convex type) and other lens shapes are formed.

However, all light deflection elements are formed with a reflection surface or structure which is regularly or pseudo-irregularly aligned, and therefore have a problem of the above interference (moire interference pattern) with a lens sheet represented by the BEF 102, and a problem that light deflection elements on the light deflection surface are seen through and viewed as unevenness of the brightness. As a solution for these problems, a method of using a diffusion film disclosed in Japanese Patent Application Laid-Open No. 2004-295080 is generally used between the light guide plate and lens sheet.

Further, although the BEF 185 is one of the most efficient lens sheet which enhances the brightness in the front surface direction, light condensing performance of the BEF 185 alone is not enough to provide a sufficient brightness for middle-size or large-size liquid crystal display devices over 20 inches. Although, for example, one method of arranging two BEFs 185 in a crossed manner may be used as a method of further enhancing the brightness of a liquid crystal display device, there is a problem that the view angle of the liquid crystal display device becomes extremely narrow. Compared to, for example, notebook computers and mobile information terminals, liquid crystal display devices for televisions require sufficient view angles because the liquid crystal display devices are viewed from directions other than the front direction, and therefore a sufficient view angle is required in a screen horizontal direction in particular.

Hence, there is a problem that a diffusion film with little light condensing performance needs to be arranged to cover light deflection elements formed on the light deflection surface such that the light deflection elements are not seen through, and a problem that a required brightness cannot be provided in the liquid crystal display device with a configuration using one BEF 185 as an optical sheet having light condensing performance.

By the way, as means for covering light deflection elements without using the above diffusion film, Japanese Patent Application Laid-Open No. 6-265732 and Japanese Patent Application Laid-Open No. 6-281934 disclose means for covering light deflection elements by inclining the prism sheet with respect to a direction in which the light deflection elements are aligned. According to Japanese Patent Application Laid-Open No. 6-265732, a configuration is employed where the prism sheet is inclined in a range equal to or more than 15 degrees and equal to or less than 75 degrees with respect to a direction in which the light deflection elements are aligned, and the prism sheet is inclined in a range equal to or more than 15 degrees and equal to or less than 75 degrees with respect to pixels of the liquid crystal display device. Further, according to Japanese Patent Application Laid-Open No. 6-281934, a configuration is employed where the direction in which the light deflection elements are aligned and the top of the prism sheet cross in a range equal to or more than 10 degrees and equal to or less than 70 degrees.

However, although Japanese Patent Application Laid-Open No. 6-265732 discloses that, when the prism sheet is inclined in a range equal to or more than 15 degrees and equal to or more than 75 degrees, particularly, at 63.5 degrees or 26.5 degrees of the optimal angle, with respect to the pixels of the liquid crystal display device, the covering performance for the light deflection elements is optimal, the prism sheet is inclined at a great angle with respect to pixel alignment of the liquid crystal display device. The inclination of the prism sheet with respect to pixel alignment of the liquid crystal display device means that the prism sheet inclines in the vertical and horizontal directions of the screen, and therefore there is a problem that the display brightness of the liquid crystal display device is distorted vertically asymmetrically or bilaterally asymmetrically. Further, there is also a problem that the front surface brightness decreases compared to a case where the prism sheet is not inclined.

By contrast with this, Japanese Patent Application Laid-Open No. 6-281934 discloses that, in case of hexagonal arrangement in which a shape connecting the most adjacent light deflection elements of the light guide plate forms a regular triangular shape, the line (virtual line on the light guide plate) connecting the most adjacent light deflection elements and the linear top of the lens sheet preferably cross at 30 degrees. For example, referring to FIG. 6 of Japanese Patent Application Laid-Open No. 6-281934, the direction of the linear top of the lens sheet includes three types of the directions of the ±30 degree with respect to the vertical direction and horizontal direction. However, the experiment conducted by the inventors of the present invention found that, when the linear top of the lens sheet is in the horizontal direction with the configuration in Japanese Patent Application Laid-Open No. 6-281934, sufficient conversing performance cannot be provided, and, further, when the linear top of the lens sheet is in a direction at ±30 degrees with respect to the vertical direction as described above, the display brightness of the liquid crystal display is distorted as described above and the front surface brightness decreases.

Further, light guide plates for liquid crystal televisions are made thinner in recent years and intervals to arrange light deflection elements are becoming wider, and therefore the configurations disclosed in Japanese Patent Application Laid-Open No. 6-265732 and Japanese Patent Application Laid-Open No. 6-281934 have a problem that covering performance is not sufficient and unevenness of the brightness caused by the light deflection elements are seen on the screen. Hence, an illuminating device of the edge-lit type is demanded to have an optical sheet having high light condensing performance and high covering performance of preventing light deflection elements from being seen, and a liquid crystal display device is demanded to have the illuminating device which provides a high brightness and a wide horizontal view angle without distorting the display brightness.

RELATED ART DOCUMENT

Patent Document

Patent Document 1: Japanese Patent Application Publication No. 1-37801

Patent Document 2: Japanese Patent Application Laid-Open No. 6-102506
Patent Document 3: Japanese Patent Application National Publication No. 10-506500
Patent Document 4: Japanese Patent Application Laid-Open No. 2004-295080
Patent Document 5: Japanese Patent Application Laid-Open No. 6-265732
Patent Document 6: Japanese Patent Application Laid-Open No. 6-281934

SUMMARY OF THE INVENTION

The present invention is made to solve the above conventional problem, and the present invention provides an illuminating device which has a light guide body and a blurring structure and a display device using the illuminating device which reduces unevenness of the brightness by blurring light deflection elements formed on the light deflection surface of the light guide plate, and enhances the brightness in the front surface direction without significantly distorting the display brightness of the display device.

The present invention takes the following means to solve the above problem.

That is, the first invention is the illuminating device which has: a light source; a light guide body which has an incidence surface on which light emitted from the light source is incident, an emission surface which emits the incident light toward a viewer, and a light deflection surface which guides the incident light to the emission surface; a reflection sheet which reflects the light emitted from a surface on a side opposite to the emission surface to guide to the light guide body; and a blurring structure, and in which: the light deflection surface has light deflection elements which guide light incident on the light guide body toward the emission surface; the light deflection elements are arranged in two-dimensional alignment by aligning the light deflection elements at nearly equal intervals of a first pitch $P_1$ in a first direction, and at nearly equal intervals of a second pitch $P_2$ in a second direction nearly orthogonal to the first direction; the blurring structure has a first primary surface and a second primary surface; the first primary surface has linear lenses aligned in at least one direction; a direction in which the first linear lenses extend is arranged inclining in a range equal to or more than 5 degrees and equal to or less than 45 degrees with respect to a random direction X; and the direction X matches with one of the first direction and the second direction.

The second invention is an illuminating device in which: the direction X matches with the second direction; and an angle $\theta_1$ formed between a direction in which the first linear lenses extend and the direction X is defined according to following equation 1.

$$\theta_1 = \tan^{-1}\left(\frac{P_2}{3*P_1}\right) \pm 10 [\text{deg}] \quad \text{(Equation 1)}$$

The third invention is the illuminating device in which: the light guide body has a refractive index $n_0$ and a thickness t; the first linear lenses have a convex lenticular lens shape having a refractive index $n_1$, a top of a round sectional shape and a curved lateral surface; and an angle formed between a tangent line at an arbitrary point on the curved lateral surface and the first primary surface increases from the top to a first primary surface, a maximum angle $\alpha$ of the angle being defined according to following equation 2 where $\sin\theta_i$ is determined according to following equation 3 and equation 4.

$$\alpha \geq \tan^{-1}\left\{\frac{\sin\theta_i}{\sqrt{n_1^2 - \sin^2\theta_i} - 1}\right\} \quad \text{(Equation 2)}$$

$$\sin\theta_i = n_0 \sin\left(\tan^{-1}\left(\frac{r_1}{2t}\right)\right) \quad \text{(Equation 3)}$$

$$r_1 = \frac{3 * P_1}{2 * \cos\theta_1} \quad \text{(Equation 4)}$$

The fourth invention is the illuminating device in which: the direction X matches with the first direction; and an angle $\theta_2$ formed between a direction in which the linear lenses extend and the direction X is defined according to following equation 5.

$$\theta_2 = \tan^{-1}\left(\frac{P_1}{3 * P_2}\right) \pm 10[\text{deg}] \quad \text{(Equation 5)}$$

The fifth invention is the illuminating device in which: the light guide body has a refractive index $n_0$ and a thickness t; the first linear lenses have a convex lenticular lens shape having a refractive index $n_1$, a top of a round sectional shape, and a curved lateral surface; and an angle formed between a tangent line at an arbitrary point on the curved lateral surface and the first primary surface increases from the top toward the primary surface, a maximum angle $\alpha$ of the angle being defined according to following equation 6 where $\sin\theta_i$ is defined according to following equation 7 and equation 8.

$$\alpha \geq \tan^{-1}\left\{\frac{\sin\theta_i}{\sqrt{n_1^2 - \sin^2\theta_i} - 1}\right\} \quad \text{(Equation 6)}$$

$$\sin\theta_i = n_0 \sin\left(\tan^{-1}\left(\frac{r_2}{2t}\right)\right) \quad \text{(Equation 7)}$$

$$r_2 = \frac{3 * P_2}{2 * \cos\theta_2} \quad \text{(Equation 8)}$$

The sixth invention is the illuminating device in which: the blurring structure has a convex curved shape in which a sectional shape in an alignment direction of the linear lenses has a round top and a curved line going from the top to the first primary surface, and in which an angle formed between a tangent line at an arbitrary point on the sectional shape and the first primary surface increases from the top to the first primary surface; the linear lenses convert and linearly emit part of light emitted from the emission surface in a normal direction of the first primary surface along a direction of an angle θ with respect to the first direction; the linear lenses have a maximum angle $\alpha$ formed between a tangent line at each point on the sectional shape and the first primary surface, and an refractive index $n_1$; the light guide body has a thickness t and a refractive index $n_0$; and when a light deflection element, among the light deflection element, is arranged near the light source and has an average diameter or a width D, following equation 9 and equation 10 are satisfied, a variable L shown in equation 10 is determined according to equation 11, and an angle $\theta_i$ described in equation 11 and the maximum angle $\alpha$ of the linear lenses holds a relationship of equation 12.

$$P_1 * \sin\theta - D \leq 0[\text{mm}] \quad \text{(Equation 9)}$$

$$0.5 * P_2 - 2 * L * \sin\theta - D \leq 0.1[\text{mm}] \quad \text{(Equation 10)}$$

$$L = t * \tan(\sin^{-1}(\sin\theta_i / n_0)) \quad \text{(Equation 11)}$$

$$\tan\alpha = \frac{\sin\theta_i}{\sqrt{n_1^2 - \sin^2\theta_i} - 1} \quad \text{(Equation 12)}$$

The seventh invention is the illuminating device including a blurring structure in which: when a point light source which emits nearly Lambert light is arranged on a second primary surface side of the blurring structure such that a main axis of emission light and a normal direction of the second primary surface virtually match, light converted and emitted in the first primary surface among light incident from the second primary surface is converted into linear light which widens directly above around the point light source in an alignment direction of the linear lenses; and a peak brightness position of the linear light is directly above the point light source.

The eighth invention is the illuminating device including a blurring structure in which: there is a peak brightness position of the linear light other than directly above the point light source; and, when a brightness directly above the point light source is $L_0$ and a peak brightness is $L_1$, $L_1/L_0$ is 200% or less.

Then ninth invention is the illuminating device in which n a sectional shape of the linear lenses is defined according to following equation 13, where equation 13 is an equation when a unit lens pitch of the linear lenses is normalized to 1, z is a position function in a height direction of the linear lenses and r is a width direction position variable of the linear lenses.

$$z = \frac{r^2 / R}{1 + \sqrt{1 - (1+k)(r/R)^2}} + Ar^2 + Br^4 + Cr^6 \quad \text{(Equation 13)}$$

where $-1 \leq k \leq 1$ $-10 < 1/R < 10$ $-5 < A < 5$ $-30 < B < 30$ $-30 < C < 30$ The tenth invention is the illuminating device in which $P_2/P_1$ which is a ratio of the first pitch $P_1$ and the second pitch $P_2$ is set to a range of $1.4 < P_2/P_1 < 2.2$.

The eleventh invention is the illuminating device in which $P_1/P_2$ which is a ratio of the first pitch $P_1$ and the second pitch $P_2$ is set to a range of $1.4 < P_1/P_2 < 2.2$.

The twelfth invention is the illuminating device in which the light deflection elements are arranged in two-dimensional alignment by aligning the light deflection elements at a n-fold of the first pitch $P_1$ in the first direction and aligned at a m-fold of the second $P_2$ in the second direction nearly orthogonal to the first direction, where n or m is selected from an integer between 1 to 10 at random.

The thirteenth invention is the illuminating device in which the light deflection elements are provided in hexagonal arrangement in which a triangular shape drawn by connecting three adjacent light deflection elements is a nearly triangular shape, or are provided in arrangement in which arbitrary light deflection elements are removed from the hexagonal arrangement.

The fourteenth invention is the illuminating device which has a split structure on a first primary surface side of the blurring structure, and in which: the split structure has a third primary surface and a fourth primary surface; and on the third primary surface, split lenses are aligned in at least one direction to convert and emit part of light incident from the fourth primary surface in a normal direction of the third primary surface and linearly or in a dot pattern along the second direction.

The fifteenth invention is the illuminating device which has a diffusing optical sheet comprising a Haze value equal to or more than 30% and equal to or less than 85% on a viewer side of the illuminating device.

The sixteenth invention is the display device which has: the illuminating device according to one of the first to fifteenth inventions; and an image display element which defines a display image.

The seventeenth invention is the display device in which the diffusing optical sheet has a polarizing separation reflection function.

The eighteenth invention is the display device in which the image display element defines the display image by allowing or blocking transmission of light.

The present invention provides an illuminating device which has a light guide body and blurring structure and the display device using this illuminating device which has blurring performance of blurring light deflection elements formed on a light deflection surface of the light guide body and enhances the brightness in a front surface direction without distorting a display brightness of a display device.

DETAILED DESCRIPTION OF THE EMBODIMENTS

First Embodiment

Hereinafter, the first embodiment of the present invention will be described in detail based on drawings.

Figure 1:
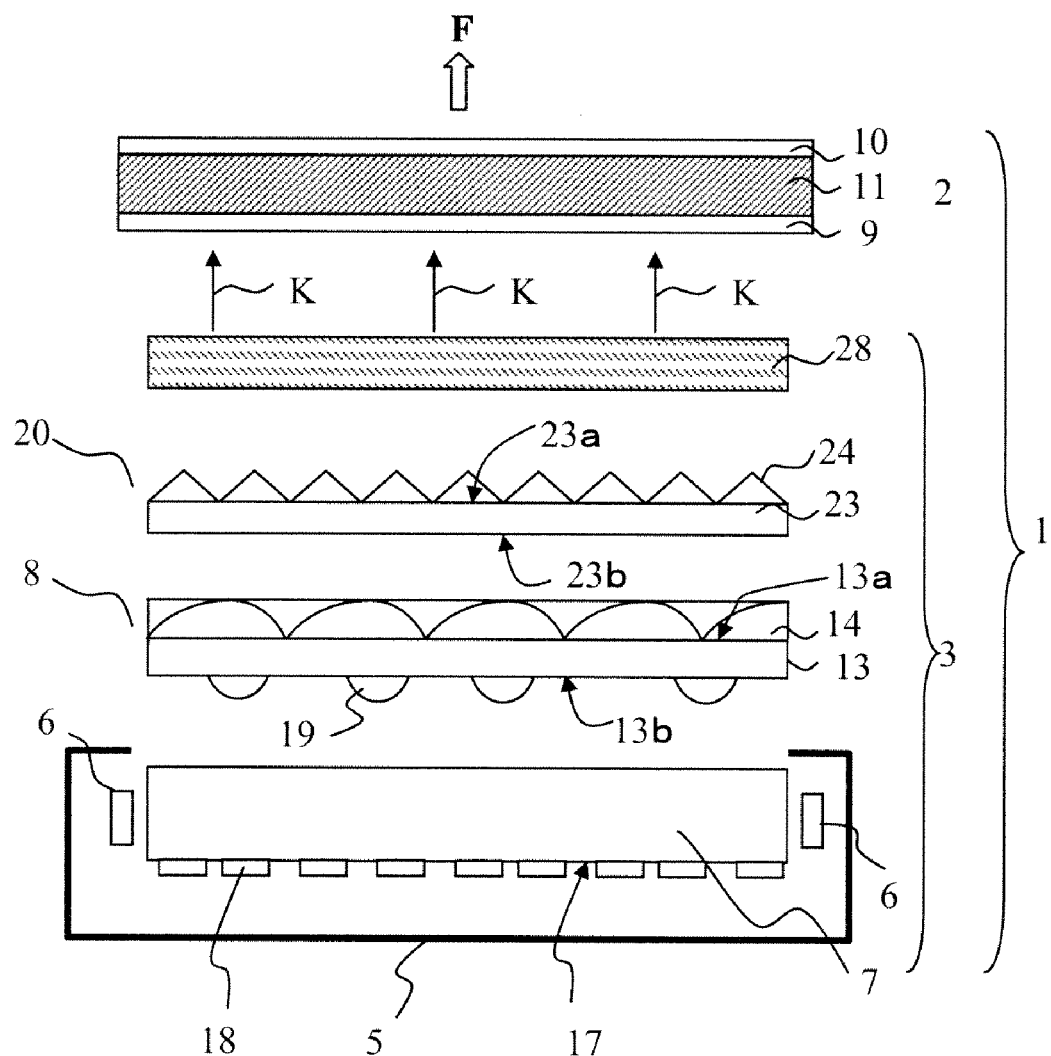
FIG. 1 is a sectional schematic view of a display device according to a first embodiment of the present invention.

FIG. 1 is a schematic sectional view of an illuminating device 3 which has a blurring structure 8 according to the first embodiment of the present invention and a display device 1 which has this illuminating device 3, and the reduced figure of each component does not match with the actual part.

The display device 1 illustrated in FIG. 1 has an image display element 2 and the illuminating device 3 which is arranged to face on a light incident side of this image display element 2.

The illuminating device 3 employs a configuration including at least a diffusing optical sheet 28, a split structure 20, the blurring structure 8 according to the present invention, a light guide body 7, light sources 6 and a reflection plate 5 which are arranged to face the light incident side of the image display element 2.

The light sources 6 are, for example, point light sources. The point light sources are, for example, LEDs (Light Emitting Diode), and the LEDs are, for example, white LEDs or RGB-LEDs formed with chips of red, green and blue which are three primary colors of light. Further, the light sources 6 may be fluorescent tubes represented by CCFL (Cold Cathode Fluorescent Lamp). Although FIG. 1 illustrates an example where the light sources 6 are arranged on two end surfaces to which the light guide body 7 opposes, the arrangement is not limited to this, and there may be cases where the light source 6 is arranged only on one end surface or cases where the light sources 6 are arranged on four end surfaces. Further, the shape of the light guide body 7 may be, for example, a wedge shape instead of a planar flat shape illustrated in FIG. 1.

The viewer side F of the light guide body 7 is an emission surface, and light deflection surface 17 is formed on the surface opposite to the emission surface. On the light deflection surface 17, the light deflection elements 18 which deflect lights incident from the light sources 6, toward the emission surface are formed, and, for example, white diffusion reflection dots are printed as the light deflection elements 18. Further, with another example, the light deflection elements 18 are each a structure having a concave or convex microlens shape or prism shape.

The light guide body 7 is generally a transparent plate, and therefore these light deflection elements 18 are seen from the viewer side F. Further, apart from the backlight of the direct-lit type, lights emitted from the light guide body 7 are uneven, and are substantially different from even diffusion light. Therefore, in the illuminating device 3 of the edge-lit type, for example, a diffusion film having high diffusing performance is generally used on the emission surface side of the light guide body 7 to blur these light deflection elements 18 and reduce unevenness of emission light. However, this diffusion film has little performance to condense lights toward the viewer side F.

Figure 2:
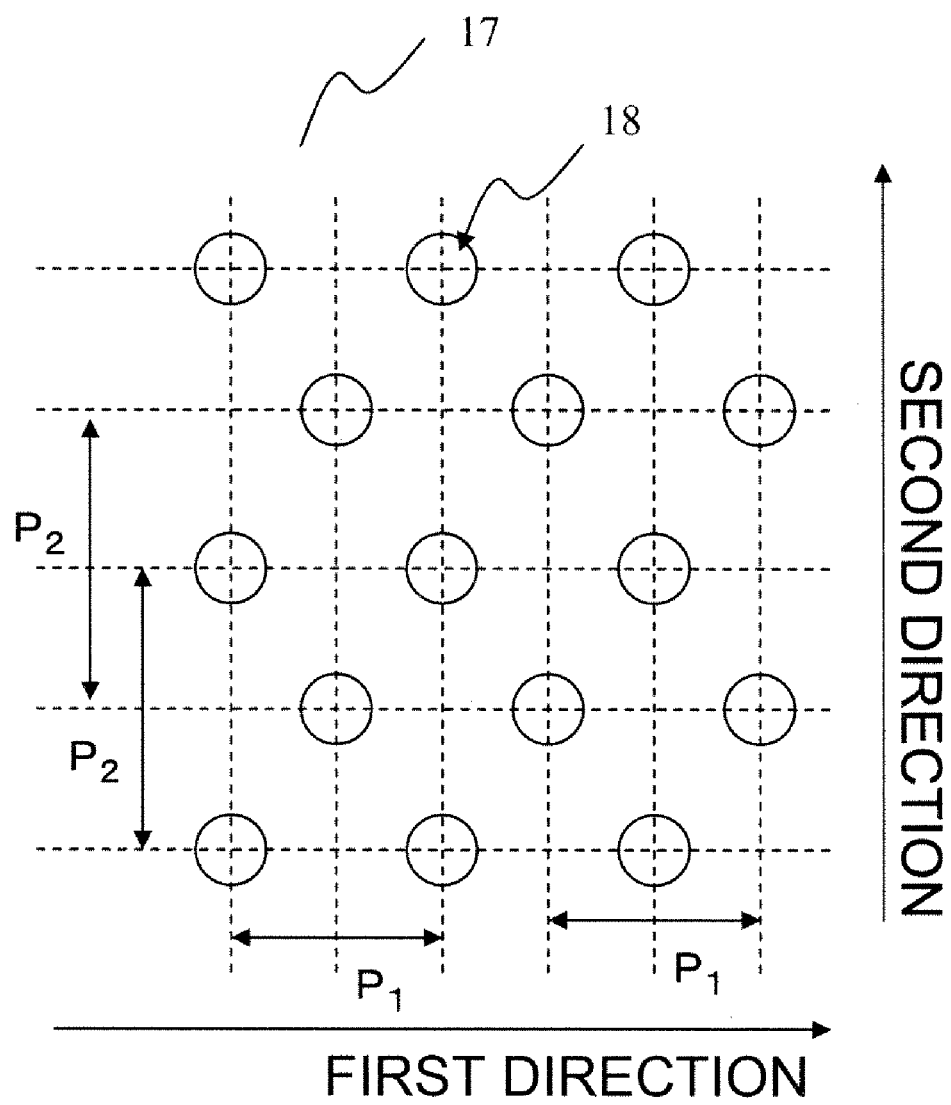
FIG. 2 illustrates an arrangement example of light deflection elements.

FIG. 2 illustrates an arrangement example of the light deflection elements 18 formed on the light deflection surface 17 of the light guide body 7. Although FIG. 2 illustrates circular shapes of the light deflection elements 18, the light deflection elements 18 may have, for example, an oval shape, prism shape or polygonal shape.

The light deflection elements 18 are provided in two-dimensional arrangement in which the light deflection elements 18 are aligned at a pitch $P_1$ in the first direction, and at a pitch $P_2$ in the second direction. Meanwhile, the first direction and second direction can be arbitrarily selected with respect to a vertical view-of-field direction and horizontal field-of-view direction of the display device 1.

Figure 3:
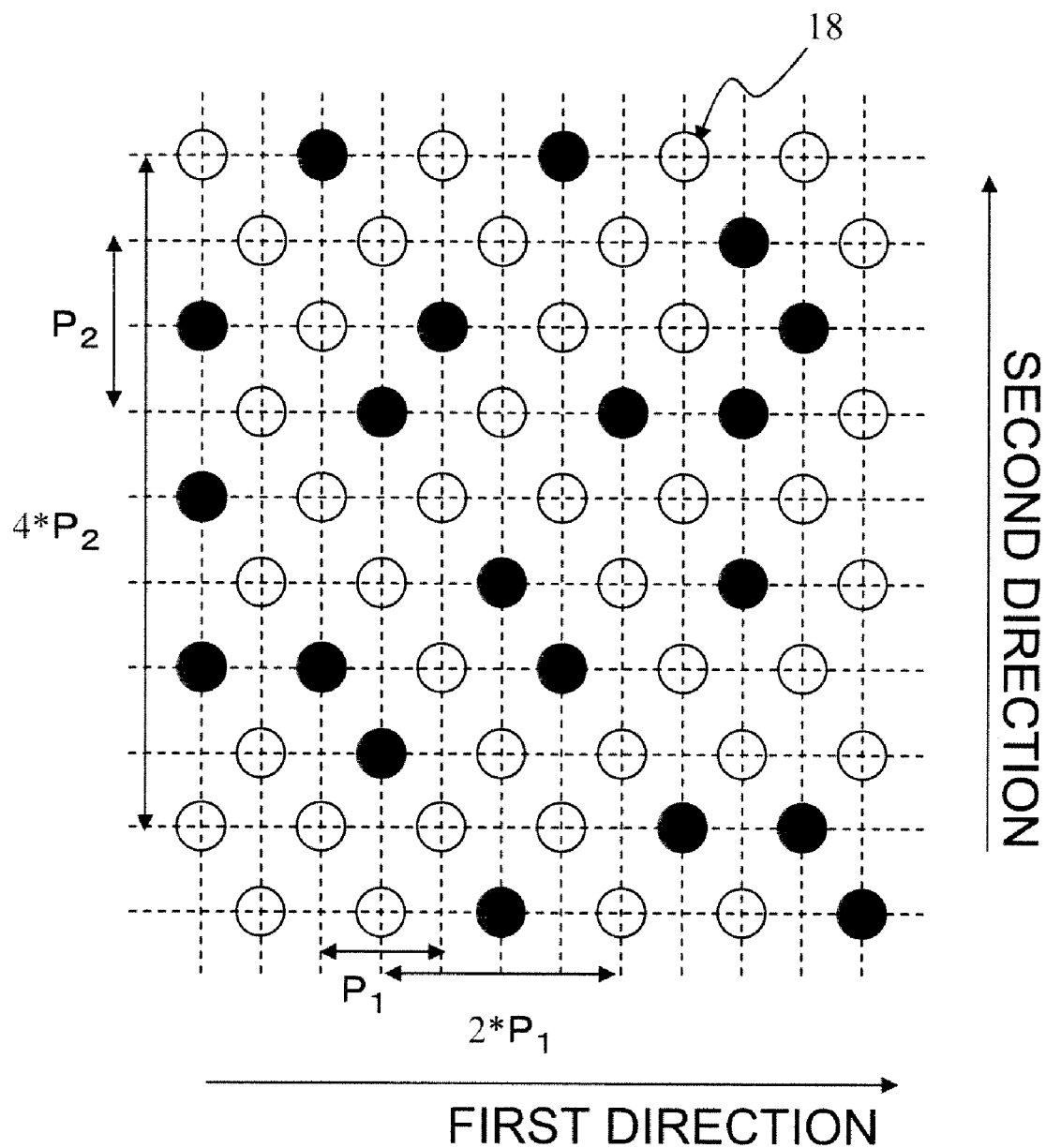
FIG. 3 illustrates another arrangement example of light deflection elements.

FIG. 3 illustrates another arrangement example of the light deflection elements 18. Although the light deflection elements 18 are provided in two-dimensional arrangement similar to the above in which the light deflection elements 18 are aligned at a pitch $P_1$ in the first direction, and at a pitch $P_2$ in the second direction, black circles are arbitrarily removed. That is, although, before the black circles are removed, this two-dimensional arrangement is exactly the same as the arrangement of the light deflection elements 18 illustrated in FIG. 2 and the light deflection elements 18 are regularly arranged, the arbitrarily selected black circles are removed to provide a pseudo-irregular arrangement. When alignment pitches of the light deflection elements 18 in particular are the same as or a value about twice or three times the structural pitch of, for example, the blurring structure 8 and split structure 20, it is possible to prevent the moire interference pattern between the light deflection elements 18 and, for example, blurring structure 8 and split structure 20 arranged on the light emission surface side of the light guide body 7. Meanwhile, the alignment pitch in the first direction is set to an integral (n) fold of $P_1$, and the alignment pitch in the second direction is set to an integral (m) fold of $P_2$. Further, n and m are set to integers between 1 and 10. It is not preferable that n and m exceed 10 because the intervals between the light deflection elements 18 become long and therefore unevenness of the brightness is seen.

Figure 4:
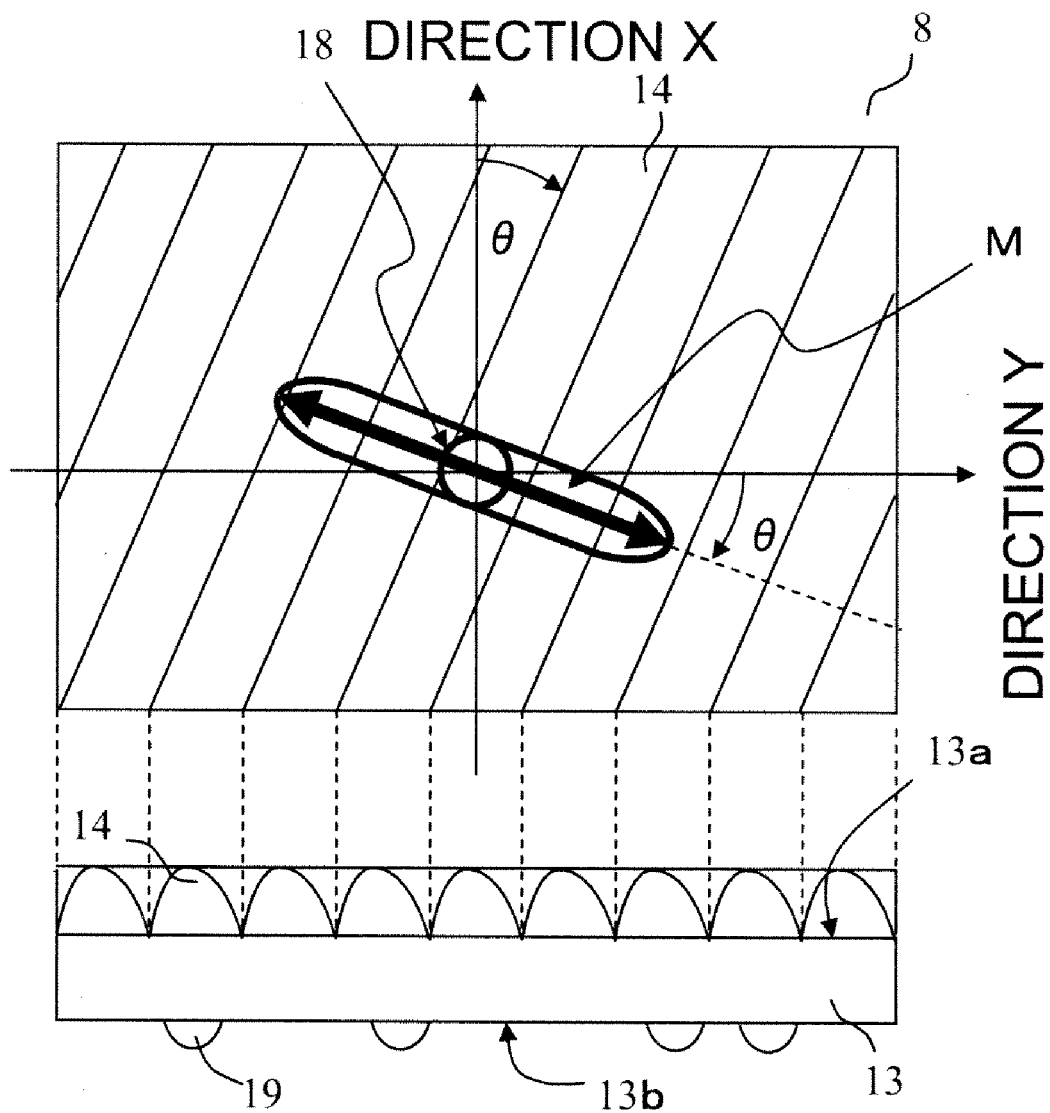
FIG. 4 is a top view and a sectional view of a blurring structure according to the first embodiment of the present invention.

In the illuminating device 3 according to the present invention, the blurring structure 8 illustrated in FIG. 4 is arranged. FIG. 4 is a top view and sectional view of the blurring structure 8. The blurring structure 8 is formed by arranging linear lenses 14 on a first primary surface 13a of the translucent base material 13. Meanwhile, the linear lens 14 is, for example, a prism lens or convex lenticular lens. Hereinafter, a case will be described where the convex lenticular lens 14 having a round top and curved lateral surfaces is used for the linear lenses 14. Further, microlenses 19 may be provided on the second primary surface 13b of the base material 13. The light emission surface of the light guide body 7 is generally a flat surface, so that it is possible to prevent optical contact between the light guide body 7 and blurring structure 8 by providing the microlenses 19 on the second primary surface 13b of the blurring structure 8. Further, the second primary surface 13b may be roughened, and, in case where the second primary surface 13b are roughened, the microlenses 19 may not be provided.

When lights are incident on the light guide body 7 from the light sources 6 and the light guide body 7 is viewed from the viewer side F, the light deflection elements 18 are seen as a dot pattern. This is because the lights which are being guided in the light guide body 7 are diffused and reflected by the light deflection elements 18 and part of the diffused and reflected lights are deflected toward the viewer side F and viewed. Further, when the blurring structure 8 is arranged on the emission surface of the light guide body 7 and is viewed from the viewer side F, light is linearized (M in FIG. 4) and seen in a direction inclined at an angle θ with respect to a direction Y orthogonal to an arbitrary direction X. That is, this is because the convex lenticular lenses 14 formed on the first primary surface 13a of the blurring structure 8 convert and emit part of lights emitted from the light guide body 7, in the normal direction of the first primary surface 13a, that is, the viewer side F. Further, when the emitted lights are viewed from the viewer side F, as illustrated in FIG. 4, lights are seen as linear light M inclined at the angle θ with respect to the direction Y.

The convex lenticular lenses 14 convert lights emitted from the light guide body 7 into linear lights M to emit, and the direction in which the linear lights M extend matches with the direction in which the convex lenticular lenses 14 are aligned. Hence, the convex lenticular lenses 14 extend in a direction inclined at the angle θ with respect to the arbitrary direction X, and are aligned in a direction inclined at the angle θ with respect to the direction Y. Meanwhile, although the direction of θ is illustrated downward from the arbitrary direction Y in FIG. 4, θ may be upward.

As illustrated in FIG. 4, the convex lenticular lenses 14 are arranged in a direction which is inclined at the angle θ with respect to the direction X and extends, and the range of the inclining angle θ is between 5 and 45 degrees or between −5 degrees and −45 degrees.

Meanwhile, the direction X matches with one of the first direction or second direction which is the above alignment direction of the light deflection elements 18. Further, when the angle θ is less than 5 degrees, there is no substantial difference from the case where the direction in which the convex lenticular lenses 14 extend and the direction X are nearly parallel. The angle θ which is sufficient to provide an effect of improving blurring performance for the light deflection elements 18 and which does not make the directions nearly parallel is 5 degrees or more. By contrast with this, the first direction and the second direction in which the light deflection elements 18 are arranged are nearly orthogonal, and the direction X matches with one of the first direction and second direction, so that the maximum value of the angle θ is 45 degrees.

Figure 5:
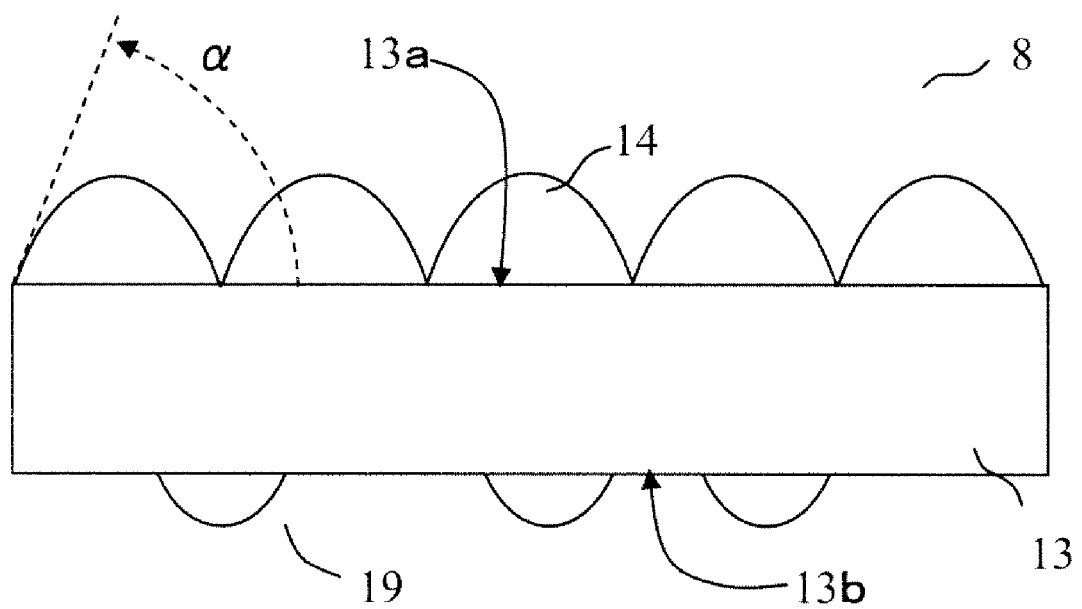
FIG. 5 is a sectional view of a convex lenticular lens in an alignment direction according to the present invention.
Figure 22:
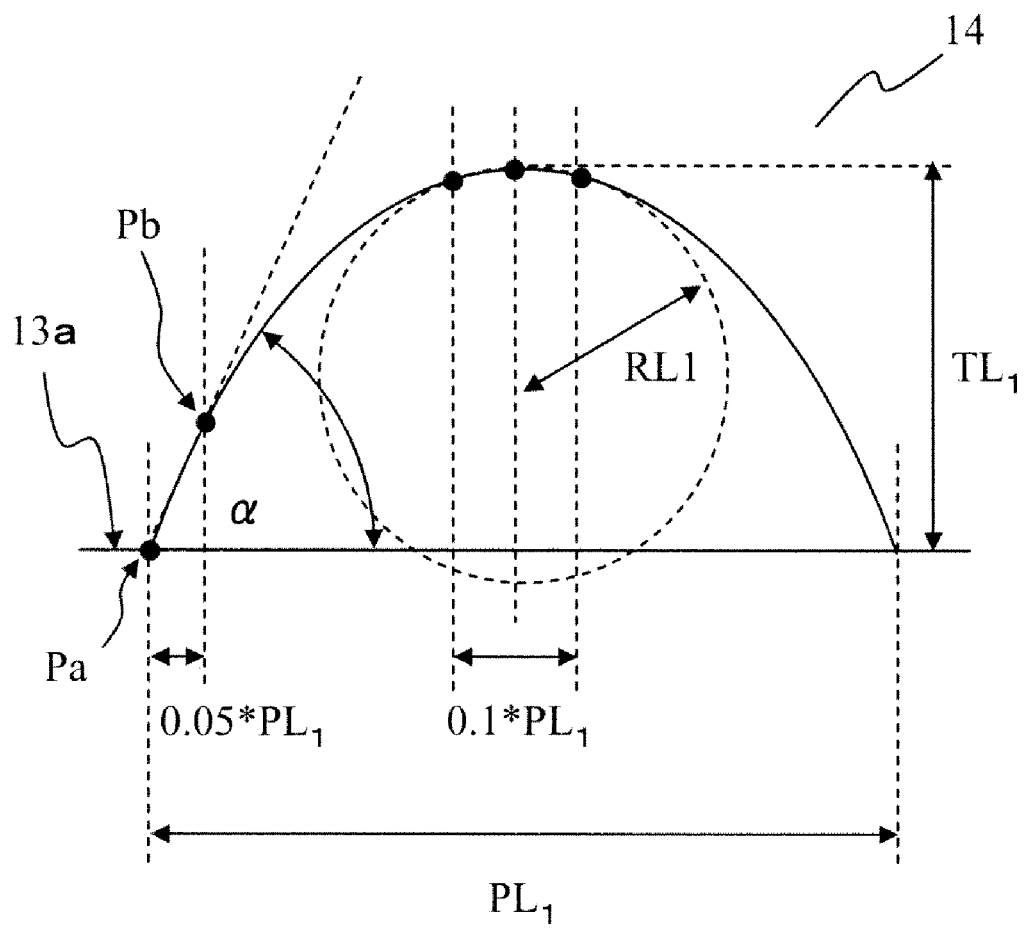
FIG. 22 is a view describing a shape of a convex lenticular lens.

FIG. 5 is a sectional view of the blurring structure 8 in a direction in which the convex lenticular lenses 14 are aligned. An angle formed between a tangent line at an arbitrary point on the curved lateral surface of the convex lenticular lens 14 and the first primary surface 13$a$ increases from the top of the convex lenticular lens 14 toward the first primary surface 13, and the maximum angle is referred to as "maximum angle α". Meanwhile, the definition of the maximum angle α will be described using FIG. 22. FIG. 22 is a sectional view of the shape of the convex lenticular lens 14 according to the present invention. The maximum angle α is formed between a line connecting a point Pa which the convex lenticular lens 14 contacts the first primary surface 13 and an arbitrary point Pb which goes toward the top from the point Pa, and the first primary surface 13$a$. Meanwhile, the distance between the point Pa and point Pb on the first primary surface 13$a$ is defined as 5% with respect to a unit lens pitch $PL_1$. The convex lenticular lens 14 has a curved shape in which the angle formed between the tangent line at an arbitrary point in the cross section of the convex lenticular lens 14 and the first primary surface 13$a$ is about 0 degree at the top, and increases toward the first primary surface 13$a$. Hence, although the angle formed between the tangent line at a point at which the unit lens contacts the first primary surface 13$a$ and the first primary surface 13$a$ is maximum, if performance of the refractive surface of the lens is evaluated, it is preferable to take into account the average angle of a finite area instead of an angle at one point. To evaluate a linearization function and light condensing performance of the convex lenticular lens 14, the inventors of the present invention decide that the maximum angle α is most adequate in an area about 5% with respect to the unit lens pitch $PL_1$ from a point at which the unit lens contacts the first primary surface 13$a$, based on the optical simulation result and experimental result, and defines the maximum angle α in this way.

When the above direction X and the second direction in which the light deflection elements 18 are aligned at the pitch $P_2$ match, an angle $\theta_1$ formed between the direction in which the lenticular lenses 14 extend and the direction X is defined according to following equation 1.

$$\theta_1 = \tan^{-1}\left(\frac{P_2}{3*P_1}\right) \pm 10[deg] \qquad \text{(Equation 1)}$$

Equation 1 will be described using FIG. 6 to FIG. 8.

Figure 6:
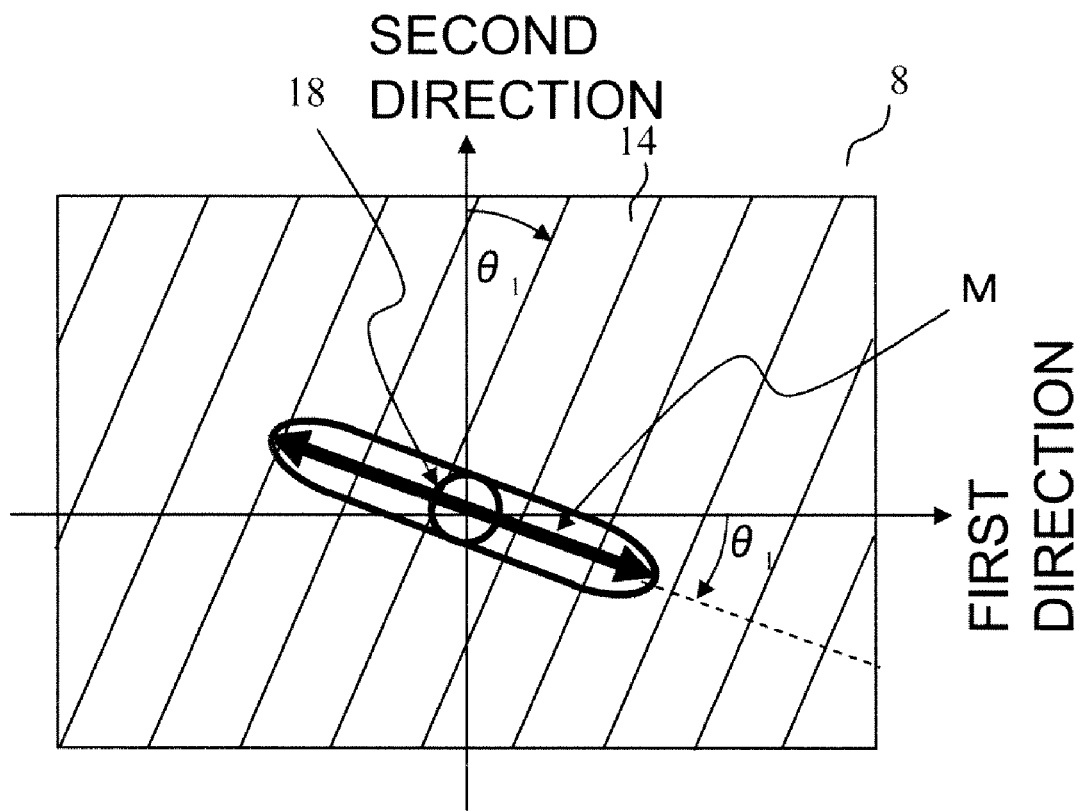
FIG. 6 is a view describing equation 1 according to the present invention.

FIG. 6 is a view describing that the convex lenticular lenses 14 linearize light of the light deflection element 18. When the blurring structure 8 having the convex lenticular lenses 14 which extend in a direction inclined at $\theta_1$ with respect to the second direction is arranged on the emission surface side of the light guide body 7, the light deflection elements 18 are seen converted into the linear lights M which widen in a direction inclined at $\theta_1$ with respect to the first direction. As described above, lights incident on the incident surface of the light guide body 7 is guided inside the light guide body 7, and the paths of the lights are deflected by the light deflection elements 18 and emitted from the emission surface. Although emission lights from the light guide body 7 are emitted not only in the normal direction of the emission surface and but also at all angles, when viewed from the emission surface side (viewer side F), lights emitted in the normal direction of the emission surface are seen, and therefore the light deflection elements 18 are seen as a dot pattern. Further, when the blurring structure 8 is arranged on the emission surface of the light guide body 7, part of lights emitted in a direction other than in the normal direction of the emission surface are deflected by the convex lenticular lenses 14 in the normal direction. In this case, as illustrated in FIG. 6, when viewed from the viewer side F, the lights are converted into the linear lights M in the alignment direction of the convex lenticular lenses 14 and seen.

Using FIG. 7, an effect when the direction in which the convex lenticular lenses 14 extend and the direction X match will be described.

The direction X and the second direction match, so that lights of the light deflection elements 18 of a dot pattern are converted into the linear lights M. As illustrated in FIG. 7, linear lights of the light deflection elements 18 aligned in the first direction are converted into long linear lights $N_1$ (long linear lights surrounded the chain lines in FIG. 7) extending in the first direction, and the long linear lights $N_1$ are aligned at an alignment pitch $P_2/2$ in the second direction.

Figure 8:
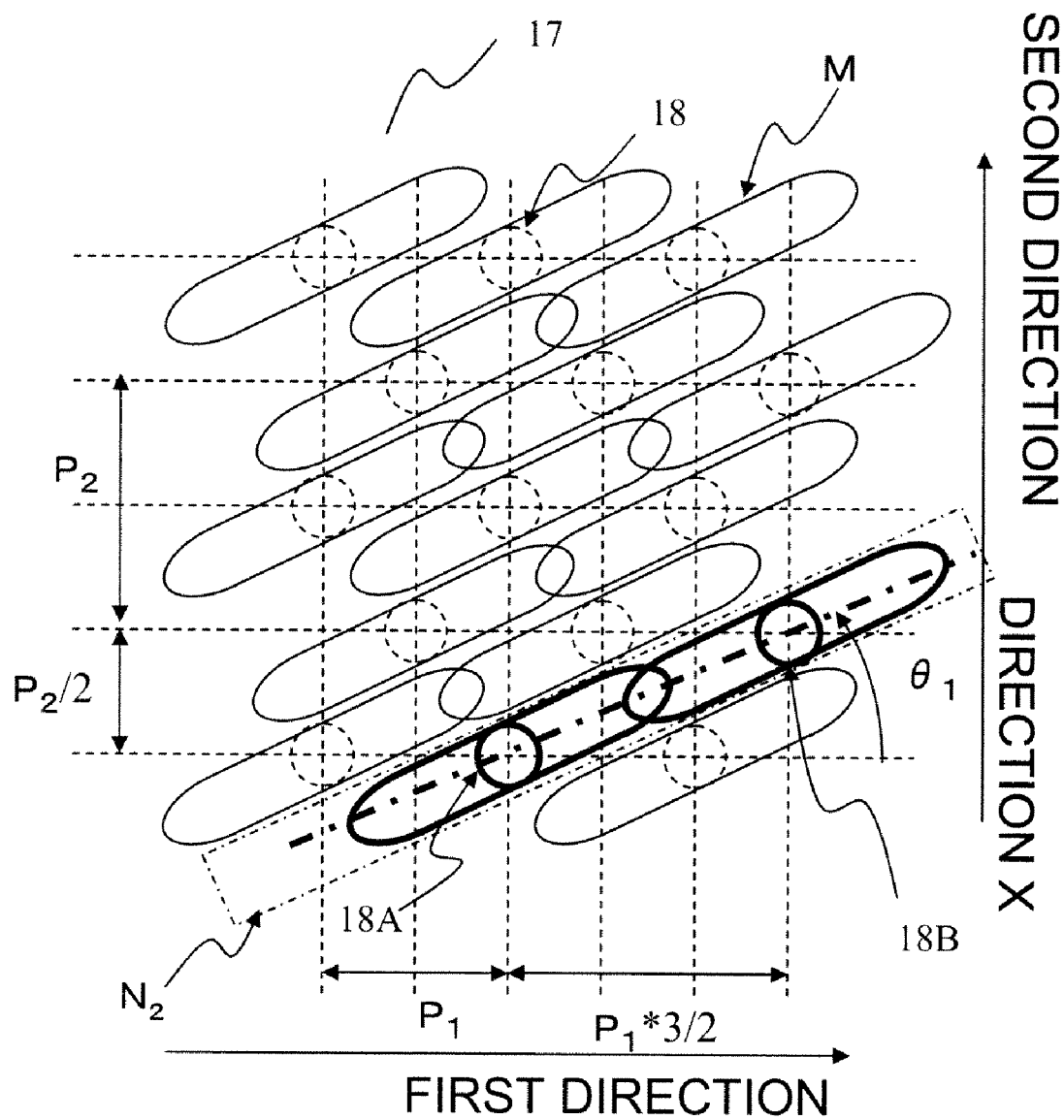
FIG. 8 is a view illustrating an effect of a blurring structure according to the present invention.

FIG. 8 illustrates an effect resulting from linearization of the image of the light deflection elements 18 when the direction in which the convex lenticular lenses 14 extend is inclined at an angle $\theta_1$ with respect to the direction X. When the direction in which the convex lenticular lenses 14 extend is inclined at the angle $\theta_1$ with respect to the direction X, the direction in which lights of the light deflection elements 18 are linearized is also inclined at the angle $\theta_1$. In this case, lights of the light deflection element 18A and light deflection element 18B shown by the bold solid lines are linearized by the convex lenticular lenses 14, and the direction in which respective linear lights M are connected is the angle $\theta_1$ defined according to equation 1. Hence, the long linear lights $N_2$ inclined at the angle $\theta_1$ with respect to the first direction is aligned in a direction inclined at the angle $\theta_1$ with respect to the second direction, and this alignment pitch is $P_1*\sin(\theta_1)$.

Figure 7:
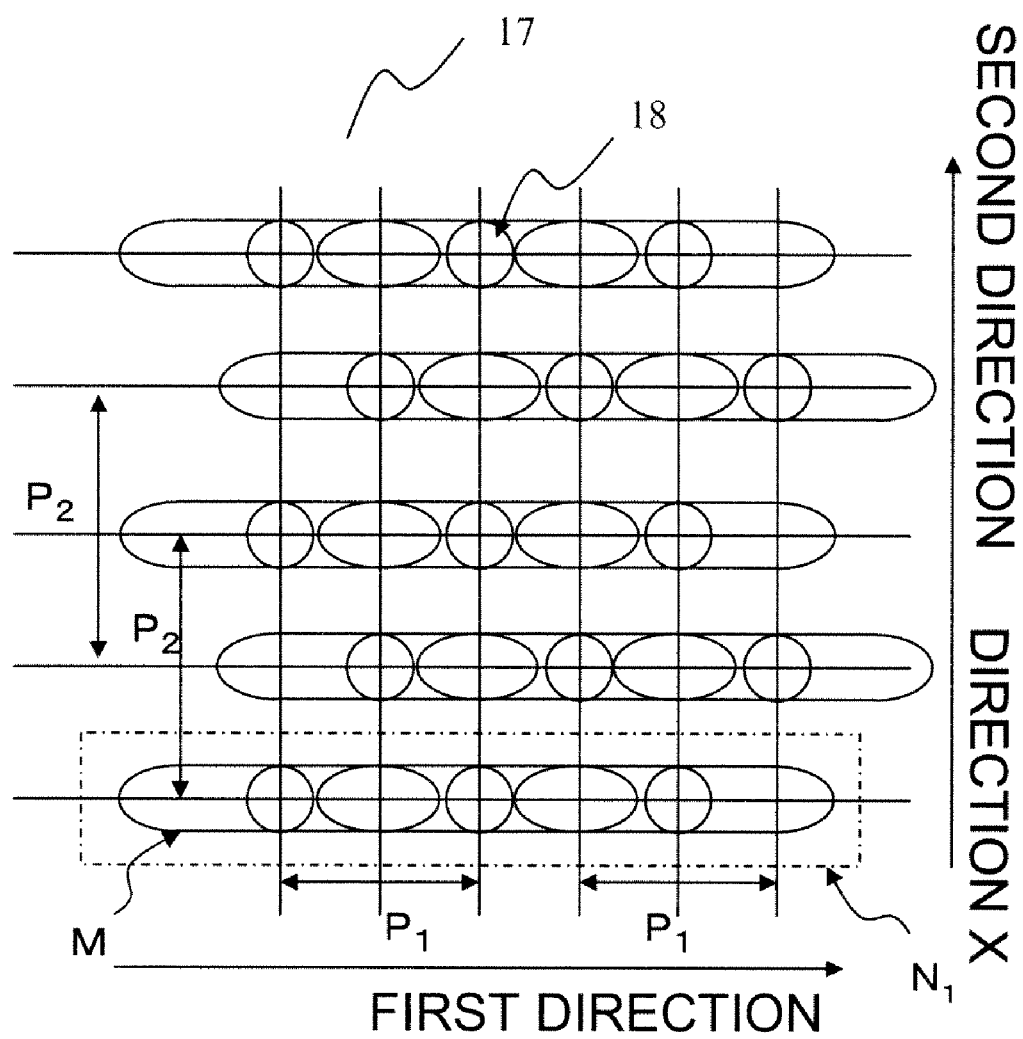
FIG. 7 is a view illustrating an effect of a convex lenticular lens without an inclination.

Upon comparison of FIG. 7 and FIG. 8, alignment pitches of the long linear lights $N_1$ and $N_2$ formed by connecting a plurality of linear lights are different. That is, by inclining the direction in which the convex lenticular lenses 14 extend, at the angle $\theta_1$ with respect to the direction X, it is possible to reduce alignment intervals between long linear lights N. The line width of the long linear light N virtually matches with the width (diameter) of the light deflection element 18. Consequently, when the alignment pitches of the long linear lights N become shorter, if the emission surface of the blurring structure 8 is viewed from the viewer side F, bright portions inside the emission surface (area the linear lights N occupy in the plane) increase, thereby increasing blurring performance for the light deflection elements 18.

The condition for reducing the alignment intervals of the long linear lights $N_2$ extending in a direction inclined at the angle $\theta_1$ with respect to the first direction is that the above alignment intervals $P_1*\sin(\theta_1)$ of the long linear lights $N_2$ illustrated in FIG. 8 are shorter than the alignment intervals $P_2/2$ of the long linear lights $N_1$ illustrated in FIG. 7. The inclining angle of the convex lenticular lens 14 is in a range equal to or more than 5 degrees and equal to or less than 45 degrees, and is $\sin(45\text{ degree})=1/\sqrt{2}$. Hence, it is preferable that the pitch $P_2$ in the second direction is $\sqrt{2}$ times the pitch $P_1$ in the first direction.

The maximum angle α of the convex lenticular lenses 14 required to form one long linear light $N_2$ by linearizing and connecting lights of the light deflection element 18A and light deflection element 18B is defined according to following equation 2.

$$\alpha \geq \tan^{-1}\left\{\frac{\sin\theta_i}{\sqrt{n_1^2 - \sin^2\theta_i} - 1}\right\} \quad \text{(Equation 2)}$$

Meanwhile, $\sin\theta_i$ described in equation 2 is defined according to following equation 3, and $r_1$ described in equation 3 is defined according to equation 4.

$$\sin\theta_i = n_0 \sin\left(\tan^{-1}\left(\frac{r_1}{2t}\right)\right) \quad \text{(Equation 3)}$$

$$r_1 = \frac{3 * P_1}{2 * \cos\theta_1} \quad \text{(Equation 4)}$$

Figure 9:
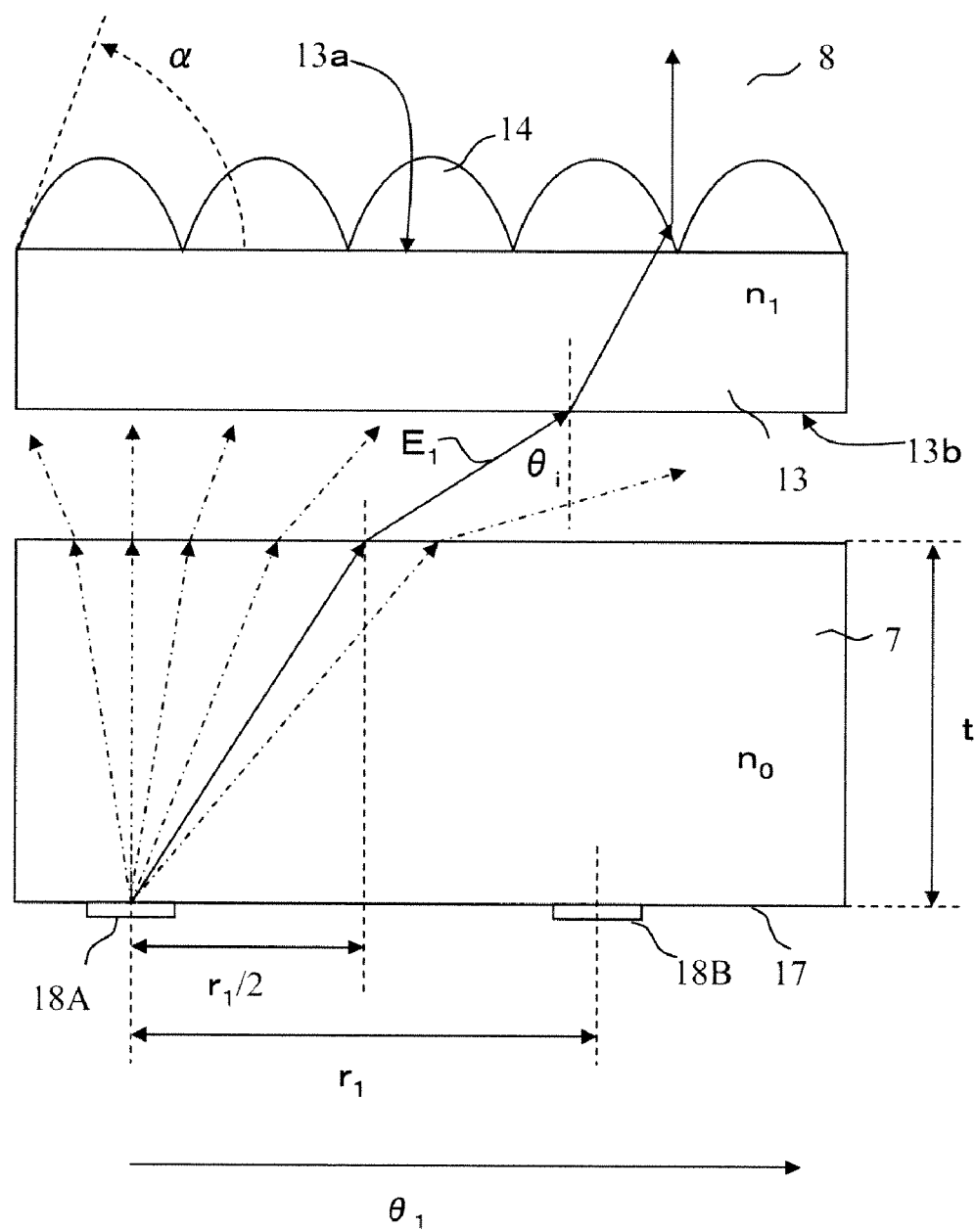
FIG. 9 is a view describing equation 2 to equation 4 according to the present invention.

Equation 2 and equation 4 will be described using FIG. 9. In addition, for ease of description, the second primary surface 13b is a flat surface, and the microlenses 19 are not shown. The light deflection elements 18 formed on the light deflection surface 17 of the light guide body 7 are aligned at the pitch $P_1$ in the first direction, and aligned at the pitch $P_2$ in the second direction. The angle formed between the line connecting the light deflection element 18A and light deflection element 18B, and the first direction is $\theta_1$, and the distance $r_1$ between the light deflection element 18A and light deflection element 18B is calculated from the angle $\theta_1$ and alignment pitch $P_1$ in the first direction. When light which is one of lights for which paths are changed by the light deflection element 18A, and which reaches the light emission surface of the light guide body 7 spaced $r_1/2$ apart from this light deflection element 18A and is emitted is $E_1$, an incident angle $\theta_i$ on the second primary surface of the blurring structure 8 is calculated from the refractive index $n_0$, thickness t and $P_1/2$ of the light guide body 7. Equation 2 defines the maximum angle $\alpha$ of the convex lenticular lens 14 required to refract light incident at the incident angle $\theta_i$ in the front surface direction. Meanwhile, $n_1$ is the refractive index of the convex lenticular lenses 14.

It naturally follows that lights guided inside the light guide body 7 exist in all directions. Although FIG. 9 subjectively illustrates behaviors of unidirectional lights traveling from the light deflection element 18A to 18B, similarly, there are also lights which are deflected by the light deflection element 18B and travel in a direction of 18A. Hence, the linear light M is linearized toward the both side around each light deflection element 18, so that, by refracting in the front surface direction the light which is incident on the light deflection element 18A, and light emitted from the light guide body 7 spaced $r_1/2$ apart, the linear light M of the light deflection element 18A and linear light M of the light deflection element 18B overlap, thereby forming one long linear light $N_2$.

The convex lenticular lenses 14 forming the blurring structure 8 each have a spherical surface formed with the round top and curved lateral surfaces, or aspheric shape. The tangent line angle of the top is about 0 degree, the maximum angle with respect to the first primary surface 13a is $\alpha$, and the tangent line angle increases from the top toward the first primary surface 13a. Further, the convex lenticular lenses 14 extend in a direction inclined at the angle $\theta_1$ with respect to the direction X. When the maximum angle $\alpha$ at the contact point at which the convex lenticular lens 14 contacts the first primary surface 13a satisfies equation 2, lights of the light deflection element 18A and light deflection element 18B linearly widen as illustrated in FIG. 8, thereby forming long linear light $N_2$.

Further, the illuminating device 3 according to the present invention further has the split structure 20 and diffusing optical sheet 28 on the emission surface side of the blurring structure 8, so that the split structure 20 provides a light splitting effect and diffusing optical sheet 28 provides a diffusing effect. Consequently, when the alignment pitch of the long linear lights $N_2$ formed by the blurring structure 8 becomes shorter, it is possible to reduce unevenness in the brightness caused by the light deflection elements 18.

The split structure 20 has the split lenses 24 on the third primary surface 23a side of the translucent base material 23, the fourth primary surface 23 may be a flat surface, may be roughened or may have the microlenses 19 formed on the second primary surface 13a side of the blurring structure 8 and roughed.

The split lens 24 has a function of splitting and/or linearizing incident light in the first direction or the second direction, and may be, for example, a triangular prism lens, curved prism lens or lenticular lens. As described above, the blurring structure 8 converts lights of the two-dimensionally aligned light deflection elements 18, into the long linear lights N. The split structure 20 splits and/or linearizes the long linear lights N in the first direction or the second direction to provide a two-dimensional diffusing effect.

By contrast with this, to increase the brightness of the illuminating device 3, the split lenses 24 forming the split structure 20 are preferably have high light condensing performance, and are preferably triangular prism lenses 24 having the apex angles in the range between 70 degrees and 110 degrees. The top of the triangular prism lens 24 may be round. This is because, if the top is round, incident light is partially diffused without being completely split, is linearized and emitted, so that blurring performance for the light deflection elements 18 improves. If the top is round, the top preferably has the roundness equal to or less than 20% of the unit pitch of the triangular prism lens 24, and more preferably has the roundness equal to or less than 10%. This is because, if the top has the roundness over 20%, although blurring performance improves, light condensing performance of the triangular prism lens 24 is significantly undermined.

Further, the split lens 24 may be a curved prism lens having the curved lateral surfaces. The curved prism lens further improves blurring performance while increasing the front surface brightness to provide both of high light condensing performance and diffusing performance. With the curved lateral surface of the curved prism lens, the angle formed between the tangent line at each point on the curved lateral surface and the first primary surface 23a of the split structure 20 preferably changes in the range between 20 degrees and 70 degrees, and more preferably changes in the range between 60 degrees and 30 degrees. When the angle goes below 20 degrees, the diffusing performance and light condensing performance decrease, and, by contrast with this, when the angle exceeds 70 degrees, diffusing performance is high and light condensing performance is low.

Further, the split lens 24 may have a convex lenticular lens shape. This is because, compared to the above triangular prism shape and curved prism lens, although light condensing performance decreases, diffusing performance is high, so that blurring performance for the light deflection elements 18 improves.

Further, when the display device 1 is, for example, liquid crystal television, the screen horizontal direction preferably has a wider field of view than a screen vertical direction. Hence, the split lenses 24 having high light condensing performance preferably extend in the screen horizontal direction, and are aligned in the screen vertical direction.

Further, a Haze value of the diffusing optical sheet 28 is preferably 30% or more and 85% or less. This is because, when the Haze value is 30% or less, diffusing performance required to reduce unevenness of the brightness caused by the light deflection elements 18 is insufficient, and, by contrast with this, when the Haze value exceeds 85%, diffusing performance is too high, and, therefore, while unevenness of the brightness is effectively reduced, the brightness of the illuminating device 3 substantially decreases. Meanwhile, the diffusing optical sheet 28 having the Haze value equal to or more than 30% and equal to or less than 85% is generally an upper diffusing sheet. The upper diffusing sheet is used for the purposes of protecting the triangular prism lens represented by the BEF and preventing side lobes produced by the triangular prism lenses. Further, with another example, a diffusing layer attached polarization split reflection sheet represented by a DBEF-D (3M company) may be used. In addition, the Haze value described here is a measurement value according to JIS K7136.

The line width of the long linear lights $N_2$ is almost equal to the diameter of the light deflection elements 18, and the alignment pitch of the long linear lights $N_2$ is preferable twice the diameter of the light deflection elements 18 or less. This is because, when the long linear lights $N_2$ are aligned such that the alignment pitch is twice the diameter of the light deflection elements or more, even if a splitting effect of the split structure 20 and a diffusing effect of the diffusing optical sheet 28 are provided, unevenness of the brightness of the long linear lights $N_2$ is seen. By contrast with this, when the alignment pitch of the long linear lights $N_1$ illustrated in FIG. 7 is twice the diameter of the light deflection elements 18 or less, the angle $\theta_1$ may be 0 degree. According to the present invention, the long linear lights N are formed by converting lights of the light deflection elements 18 arranged in a dot pattern, into the linear lights M and connecting adjacent linear lights M in a certain direction. Further, this is because the alignment interval of the long linear lights N is made twice the diameter of the light deflection element 18 or less to reduce unevenness of the brightness caused by the light deflection elements 18 according to the light splitting effect of the split structure 20 arranged on the emission surface side of the blurring structure 8 and diffusing effect of the diffusing optical sheet 28.

Although the case has been described where the direction X matches with the second direction in which the light deflection elements 18 are aligned, a case will be next described where the direction X matches with the first direction in which the light deflection elements 18 are aligned.

When the direction X matches with the first direction in which the light deflection elements 18 are aligned, the angle $\theta_2$ formed between the direction in which the convex lenticular lenses 14 extend and the direction X is defined according to following equation 5.

$$\theta_2 = \tan^{-1}\left(\frac{P_1}{3*P_2}\right) \pm 10[deg] \quad \text{(Equation 5)}$$

Figure 10:
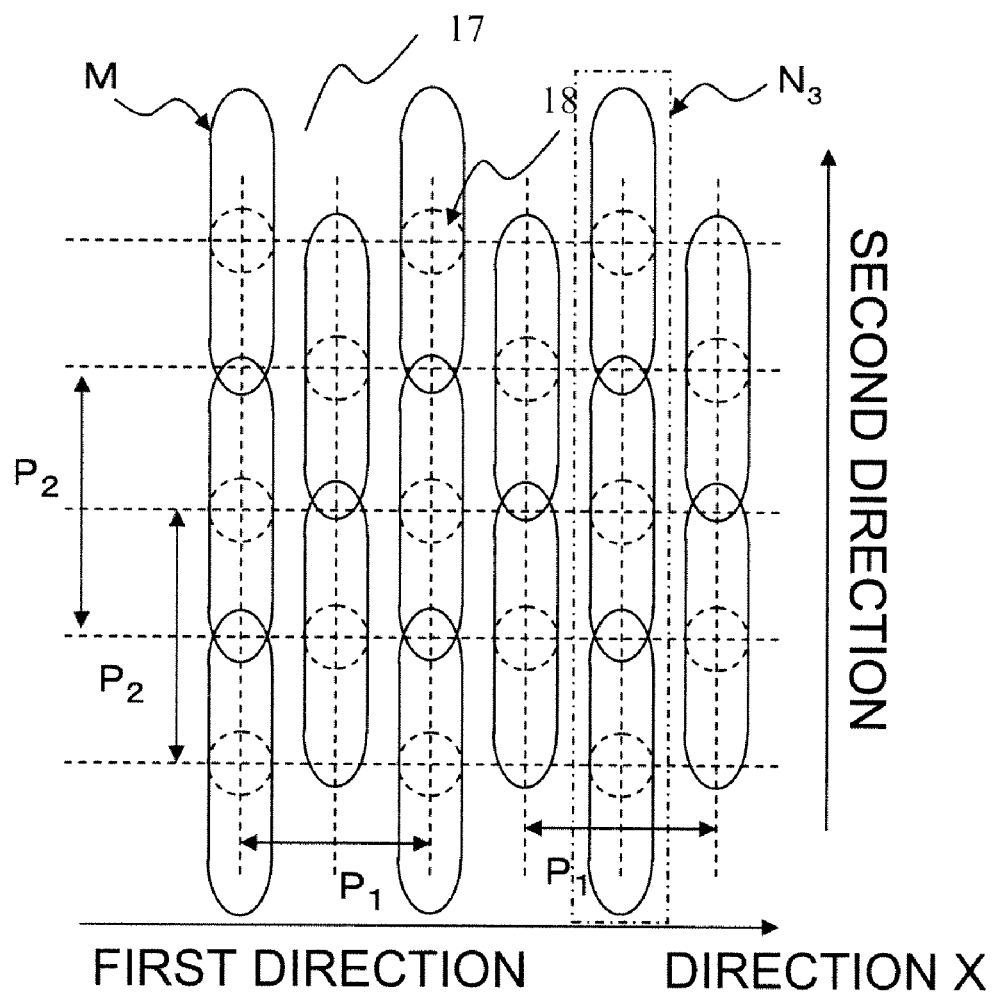
FIG. 10 is a view illustrating an effect of a convex lenticular lens without an inclination.

Equation 5 will be described using FIG. 10 and FIG. 11. FIG. 10 is a view illustrating an effect in case where the direction X and the first direction in which the light deflection elements 18 are aligned match, and the direction in which the convex lenticular lenses 14 extend and the direction X match. The direction in which the convex lenticular lenses 14 extend and the first direction match, so that, as illustrated in FIG. 10, lights of the light deflection elements 18 are linearized in the second direction. Long linear lights $N_3$ formed by connecting the linear lights M of adjacent light deflection elements 18 are arranged at a pitch $P_1/2$ in the first direction.

Figure 11:
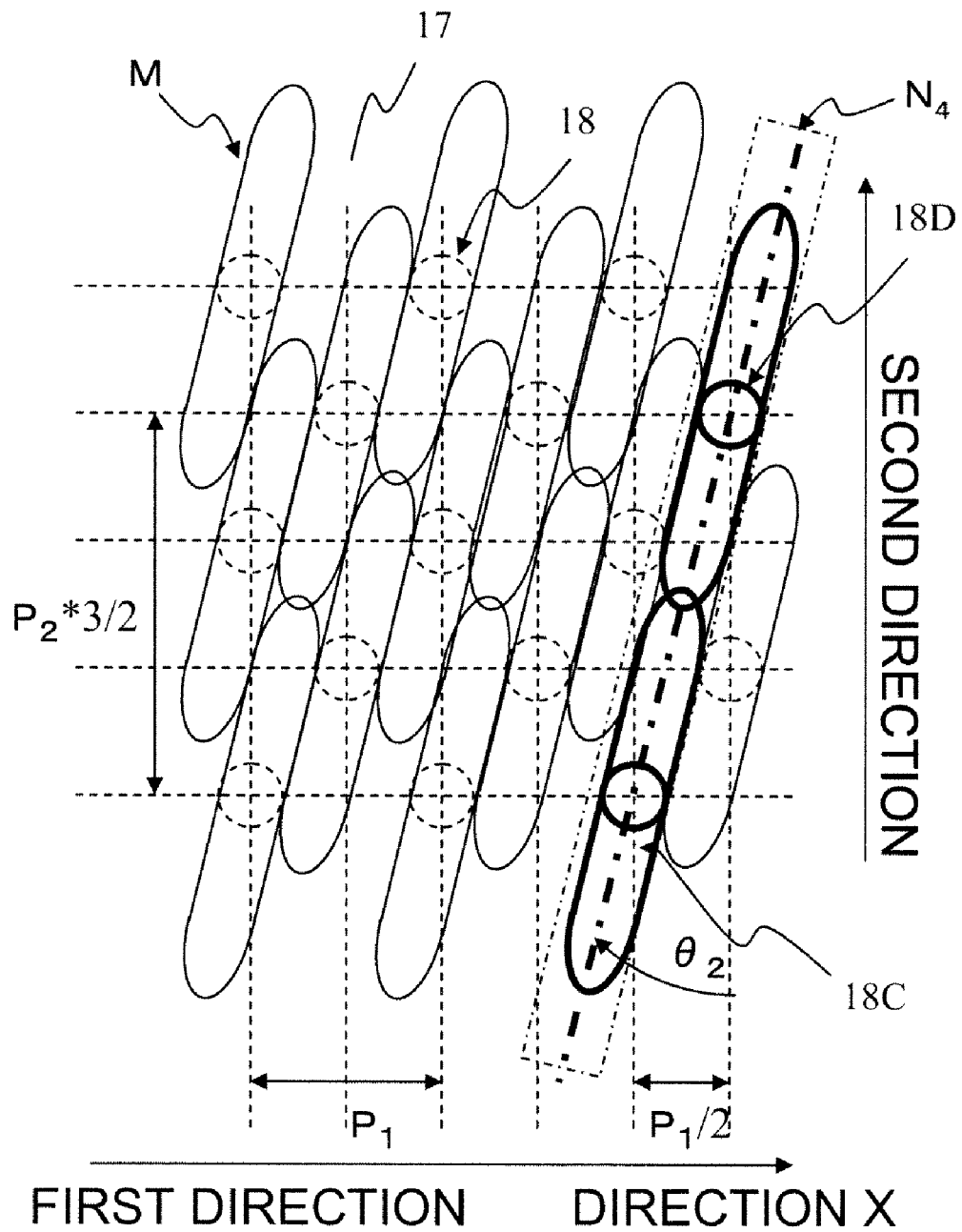
FIG. 11 is a view illustrating an effect of a blurring structure according to the present invention.

FIG. 11 illustrates a case where the direction in which the convex lenticular lenses 14 extend is inclined at $\theta_2$ with respect to the direction X. When the direction in which the convex lenticular lenses 14 extend is inclined at the angle $\theta_2$ with respect to the direction X, that is, the first direction, the direction in which lights of the light deflection elements 18 are linearized is inclined at the $\theta_2$ with respect to the second direction. Hence, the long linear lights $N_4$ are aligned at the angle $\theta_2$ with respect to the first direction, and alignment interval is $P_2*\sin(\theta_2)$. As described above, when the alignment pitch of the long linear lights $N_4$ is twice the diameter of the light deflection elements 18 or less, unevenness of the brightness caused by the light deflection elements 18 decreases. By contrast with this, as illustrated in FIG. 10, the long linear lights $N_3$ are aligned at the pitch $P_1/2$ in the first direction, and, in this case, when $P_1/2$ is smaller than twice the diameter of the light deflection element 18, $\theta_2$ may be 0 degree.

Meanwhile, lights of the light deflection element 18C and light deflection element 18D are linearized, and the maximum angle α of the convex lenticular lenses 14 required for connecting these lights is defined according to following equation 6.

$$\alpha \geq \tan^{-1}\left\{\frac{\sin\theta_i}{\sqrt{n_1^2 - \sin^2\theta_i} - 1}\right\} \quad \text{(Equation 6)}$$

Meanwhile, $\sin\theta_i$ described in equation 6 is defined according to following equation 7, and $r_2$ described in equation 7 is defined according to equation 8.

$$\sin\theta_i = n_0 \sin\left(\tan^{-1}\left(\frac{r_2}{2t}\right)\right) \quad \text{(Equation 7)}$$

$$r_2 = \frac{3*P_2}{2*\cos\theta_2} \quad \text{(Equation 8)}$$

Figure 12:
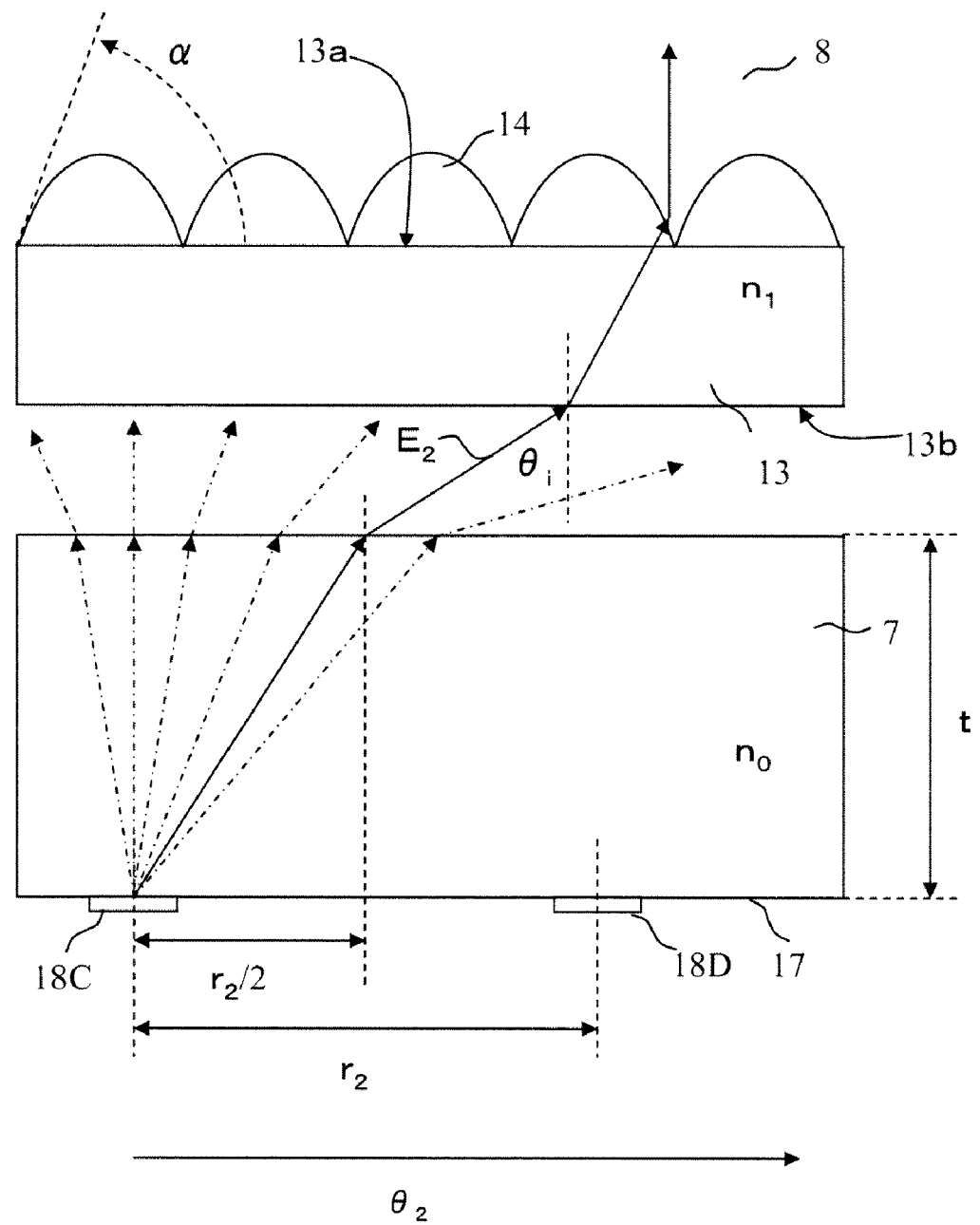
FIG. 12 is a view describing equation 6 to equation 8 according to the present invention.

Equation 6 to equation 8 will be described using FIG. 12. In addition, for ease of description, the second primary surface 13b is a flat surface, and the microlenses 19 will be not be shown.

The light deflection elements 18 formed on the light deflection surface 17 of the light guide body 7 are aligned at the pitch $P_1$ in the first direction, and aligned at the pitch $P_2$ in the second direction. The angle formed between the line connecting the light deflection element 18C and light deflection element 18D, and the second direction is $\theta_2$, and the distance $r_2$ between the light deflection element 18C and light deflection element 18D is calculated from the angle $\theta_2$ and alignment pitch $P_2$ in the second direction. When light which is one of lights for which paths are changed by the light deflection element 18C, and which reaches the light emission surface of the light guide body 7 spaced $r_2/2$ apart from this light deflection element 18C and is emitted is $E_2$, an incident angle $\theta_i$ on the second primary surface of the blurring structure 8 is calculated from the refractive index $n_0$, thickness t and $P_2/2$ of the light guide plate.

Equation 6 defines the maximum angle α of the convex lenticular lens 14 required to refract light incident at the incident angle $\theta_i$ in the front surface direction. Meanwhile, $n_1$ is the refractive index of the convex lenticular lenses 14.

The convex lenticular lens 14 is formed with a round top and curved lateral surfaces. The tangent line angle of the top is 0 degree, the maximum angle at the contact point with the first primary surface 13a is α and the tangent line angle increases from the top to the first primary surface 13a. Further, the lenticular lenses 14 extend in a direction inclined at the angle $\theta_2$ with respect to the following direction X.

When the maximum α at the contact point at which the convex lenticular lens 14 contacts the first primary surface 13a satisfies equation 6, lights of the light deflection element 18C and light deflection element 18D linearly widen as illustrated in FIG. 11 and are connected, thereby forming the long linear light $N_4$, so that the light splitting effect of the split structure 20 and diffusing effect of the diffusing optical sheet 28 improve blurring performance for the light deflection elements 18 and reduce unevenness of the brightness caused by the light deflection elements 18.

Although an effect that the inclining angle of the convex lenticular lenses 14 improves blurring performance when the direction X matches with the first direction or second direction has been described, the inclining angle $\theta_1$ or $\theta_2$ is preferably in a range equal to or more than 5 degrees and equal to or less than 45 degrees, or equal to or more than −5 degrees and equal to less than −45 degrees. Further, as represented by equation 1 and equation 5, the inclining angles $\theta_1$ and $\theta_2$ are determined based on the alignment pitch $P_1$ in the first direction in which the light deflection elements 18 are aligned, and the alignment pitch $P_2$ in the second direction.

As illustrated in FIG. 2, the light deflection elements 18 formed on the light deflection surface 17 of the light guide body 7 forming the display device 1 according to the present invention are formed in two-dimensional alignment in which the light deflection elements 18 are arranged at the pitch $P_1$ in the first direction and arranged at the pitch $P_2$ in the second direction. In this case, preferably, the ratio of $P_1$ and $P_2$ is set in the range of $1.4 < P_2/P_1 < 2.2$ when the pitch $P_2$ in the second direction is greater than the pitch $P_1$ in the first direction, and is $1.4 < P_1/P_2 < 2.2$ when the pitch $P_2$ in the second direction is smaller than the pitch $P_1$ in the first direction. Further, the light deflection elements 18 are preferably provided in hexagonal arrangement in which the triangular shape connecting the three adjacent light deflection elements 18 is nearly a regular triangle. That is, $P_1/P_2$ or $P_2/P_1$ is about 1.73.

By making the arrangement of the light deflection elements 18 similar to the hexagonal arrangement, the distances between the light deflection elements 18 also become more uniform without being substantially different in the vertical direction, horizontal direction and oblique direction in the plane of the light deflection surface 17, and, consequently, it is easy to reduce unevenness of the brightness.

When the hexagonal arrangement is provided such that the pitch $P_2$ in the second direction is greater than the pitch $P_1$ in the first direction with the two-dimensional alignment of the light deflection elements 18, and, when the first direction matches with the screen horizontal direction of the display device 1, the inclining angle $\theta_1$ of the convex lenticular lenses 14 defined according to equation 1 is about 30 degrees. By contrast with this, when the second direction matches with the screen horizontal direction of the display device 1, the inclining angle $\theta_2$ of the convex lenticular lenses 14 defined according to equation 5 is about 10 degrees. As described, when the inclining angle of the convex lenticular lenses 14 becomes great, there is a problem that field-of-view characteristics of the display device 1 are distorted. However, the illuminating device 3 forming the display device 1 according to the present invention further has the split structure 20 and diffusing optical sheet 28 on the emission surface of the blurring structure 8, and, consequently, provides a feature of canceling distortion of the field-of-view characteristics of the display device 1.

As described above, with the split structure 20, the split lenses 24 having high light condensing performance extend in the screen horizontal direction of the display device 1 and are preferably aligned in the screen vertical direction on the third primary surface 23a side of the translucent base material 23. By providing this split structure 20, it is possible to substantially reduce distortion of the field of view caused by the blurring structure 8. Particularly, it is preferable to improve light condensing performance of the split lenses 24 forming the split structure 20 more than light condensing performance of the convex lenticular lenses 14 forming the blurring structure because the light condensing performance of the split structure 20 becomes dominant with the field-of-view characteristics, and the distortion is canceled as a result.

Further, the diffusing optical sheet 28 having the Haze value equal to or more than 30% and equal to or less than 85%, so that distortion of the field of view caused by the blurring structure 8 is further reduced.

Figure 13:
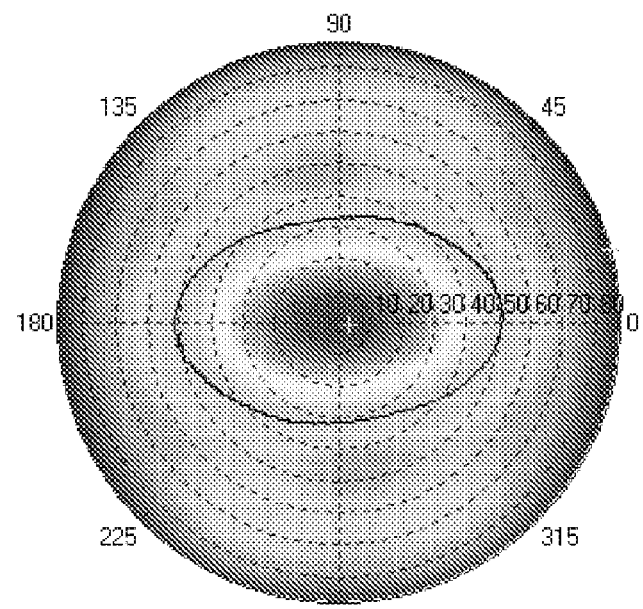
FIG. 13A is a view describing view angle characteristics of a display device when an inclination θ is 0 degree.
FIG. 13B is a view describing that a blurring structure distorts a view angle of a display device.
Figure 13:
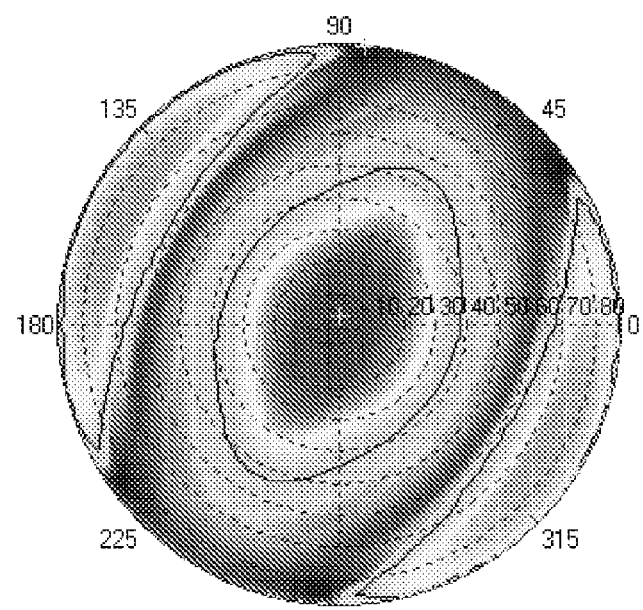
Figure 14:
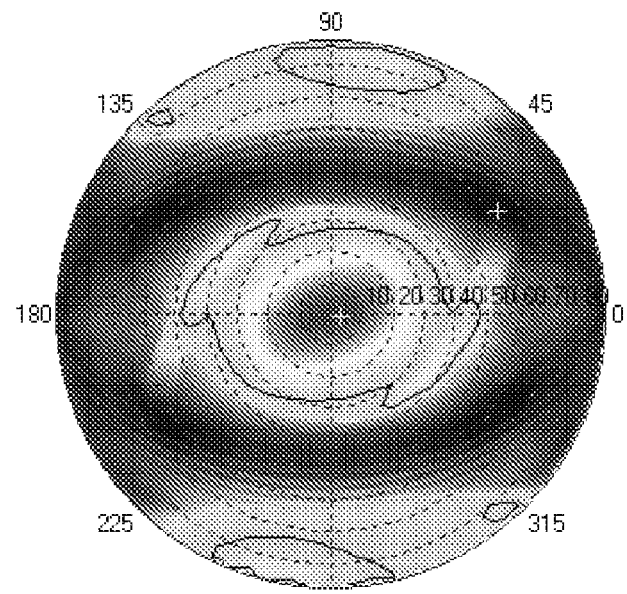
FIG. 14A is a view describing that a split structure reduces view angle distortion.
FIG. 14B is a view describing view angle characteristics of a display device according to the present invention.
Figure 14:
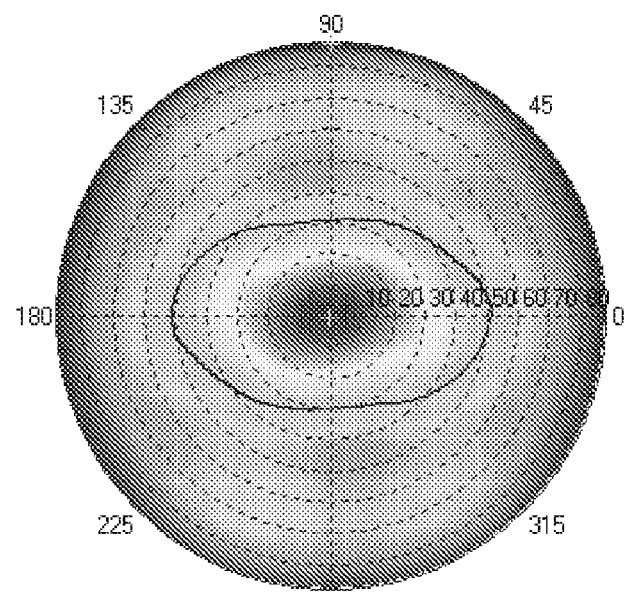

FIG. 13A illustrates an example of a measurement result of view angle in case where, in the display device 1 according to the present invention, the convex lenticular lenses 14 forming the blurring structure 8 extend in the screen vertical direction and are aligned in the screen horizontal direction. In this case, on the emission surface side of the light guide body 7 of the illuminating device 3, the blurring structure 8, split structure 20, BEF (3M company) and DBEF-D (3M company) which is the diffusing optical sheet 28 are arranged in this order. By contrast with this, FIG. 13B is an example of a measurement result of the view angle in case where the convex lenticular lenses 14 are aligned such that the direction in which the convex lenticular lenses 14 is inclined at 30 degrees with respect to the screen vertical direction. With the configuration of the illuminating device 3, only the blurring structure 8 is arranged on the emission surface side of the light guide body 7. The convex lenticular lenses 14 are arranged inclining at 30 degrees with respect to the screen vertical direction, and therefore the view angle of the display device 1 is significantly distorted. Next, FIG. 14A illustrates an example of a measurement result of the view angle in case where the BEF is added to the configuration of FIG. 13B. Further, although there is a little distortion, the distortion of the view angle of the display device 1 is reduced compared to FIG. 13B. Further, FIG. 14B illustrates an example of a measurement result of the view angle in case where the DBEF-D is further added in FIG. 14A. Although the view angle is significantly distorted only with the blurring structure 8, it is possible to provide the display device 1 which cause little distortion of the view angle by arranging the split structure 20 and diffusing optical sheet 28. In addition, the view angle measuring device illustrated in FIG. 13 and FIG. 14 is EZContrast (EL-DIM corporation).

The convex lenticular lenses 14 forming the blurring structure 8 according to the present invention are aligned inclining at the inclining angle $\theta_1$ defined according to equation 1 or inclining angle $\theta_2$ defined according to equation 5 with respect to the direction X. The direction X matches with the first direction or second direction in which the light deflection elements 18 are aligned, and the first direction and second direction match with one of the screen vertical direction or the screen horizontal direction of the display device 1. In other words, the convex lenticular lenses 14 are arranged inclining at the inclining angle $\theta_1$ defined according to equation 1 or inclining angle $\theta_2$ defined according to equation 5 with respect to one of the screen vertical direction or screen horizontal direction of the display device 1. By contrast with this, the split lenses 24 forming the split structure 20 preferably extend in the screen horizontal direction of the display device 1 and are aligned in the screen vertical direction. That is, the convex lenticular lenses 14 and split lenses 24 are arranged to cross each other, and the convex lenticular lenses 14 are aligned inclining in one of the screen vertical direction and screen horizontal direction of the display device 1 and the split lenses 24 are aligned in the screen vertical direction.

In addition, U.S. Pat. No. 5,280,371 (Honeywell Intentional, Inc.) which is a related art document discloses arranging two lenses to cross each other and aligning one of the lenses inclining with respect to one of the screen vertical direction and screen horizontal direction. However, U.S. Pat. No. 5,280,371 discloses a technique directed to reducing a moire interference pattern between regularly aligned lenses and pixels having a periodic structure. By contrast with this, the arrangement of the blurring structure 8 and split structure 20 according to the present invention is directed to blurring the light deflection elements 18 formed on the light guide body 7 and reducing unevenness of the brightness in the screen. Hence, the purposes are completely different, and therefore resulting effects are different. Further, the diffusing optical sheet 28 is arranged between the blurring structure 8 and split structure 20, and the image display element 2. The Haze value of the diffusing optical sheet 28 is 30% or more and 85% or less, thereby scattering periodic alignment of the blurring structure 8 and split structure 20 and preventing an occurrence of a moire interference pattern with the periodic structure of the display element 2. Consequently, the inclination of the convex lenticular lenses 14 forming the blurring structure 8 contributes to preventing the moire interference pattern in the display device 1 according to the present invention, and this is completely different from the above related art document.

The case has been described above where the convex lenticular lenses 14 are inclined with respect to the screen vertical direction or screen horizontal direction of the display device 1. However, although the first direction and the second direction in which the light deflection elements 18 are aligned can be arbitrarily selected in the screen vertical direction and horizontal direction of the display device 1, with another example, the first direction and second direction may be inclined at the angle $\theta_1$ defined according to equation 1 or angle $\theta_2$ defined according to equation 5 with respect to the vertical direction and horizontal direction. In this case, the direction in which the convex lenticular lenses 14 extend is set in one of the vertical direction and horizontal direction of the display device 1. The feature of the present invention includes that the direction in which the linear lights M of the convex lenticular lenses 14 forming the blurring structure 8 according to the present invention extend and the first direction in which the light deflection elements 18 are aligned are inclined at the angle $\theta_1$ or angle $\theta_2$, thereby improving blurring performance for the light deflection elements 18, and, consequently, alignment of the convex lenticular lenses 14 or light deflection elements 18 may be inclined in the vertical direction or horizontal direction of the display device 1.

Second Embodiment

The first embodiment of the present invention has been described. As an example, when the light deflection elements 18 formed on the light deflection surface 17 of the light guide body 7 are provided in hexagonal arrangement and the first direction matches with the screen horizontal direction of the display device 1, the inclining angle $\theta_1$ of the convex lenticular lenses 14 defined according to equation 1 is preferably about 30 degrees as described above. However, when the inclining angle $\theta$ increases, there is a problem that the front surface brightness of the display device 1 decreases compared to the case where the inclining angle $\theta$ is 0 degree. Although the inclining angle $\theta$ of the convex lenticular lenses 14 forming the blurring structure 8 according to the present invention is set in a range equal to or more than 5 degree and equal to or less than 45 degrees, or equal to or more than −5 degrees and equal to or less than −45 degrees, the inclining angle $\theta$ of the convex lenticular lenses 14 is preferably set smaller to reduce unevenness of the brightness by blurring the light deflection elements 18 and obtain the display device 1 having a higher brightness.

Next, the second embodiment according to the present invention where the inclining angle $\theta$ of the convex lenticular lenses 14 is set as small as possible will be described in detail below.

Figure 15:
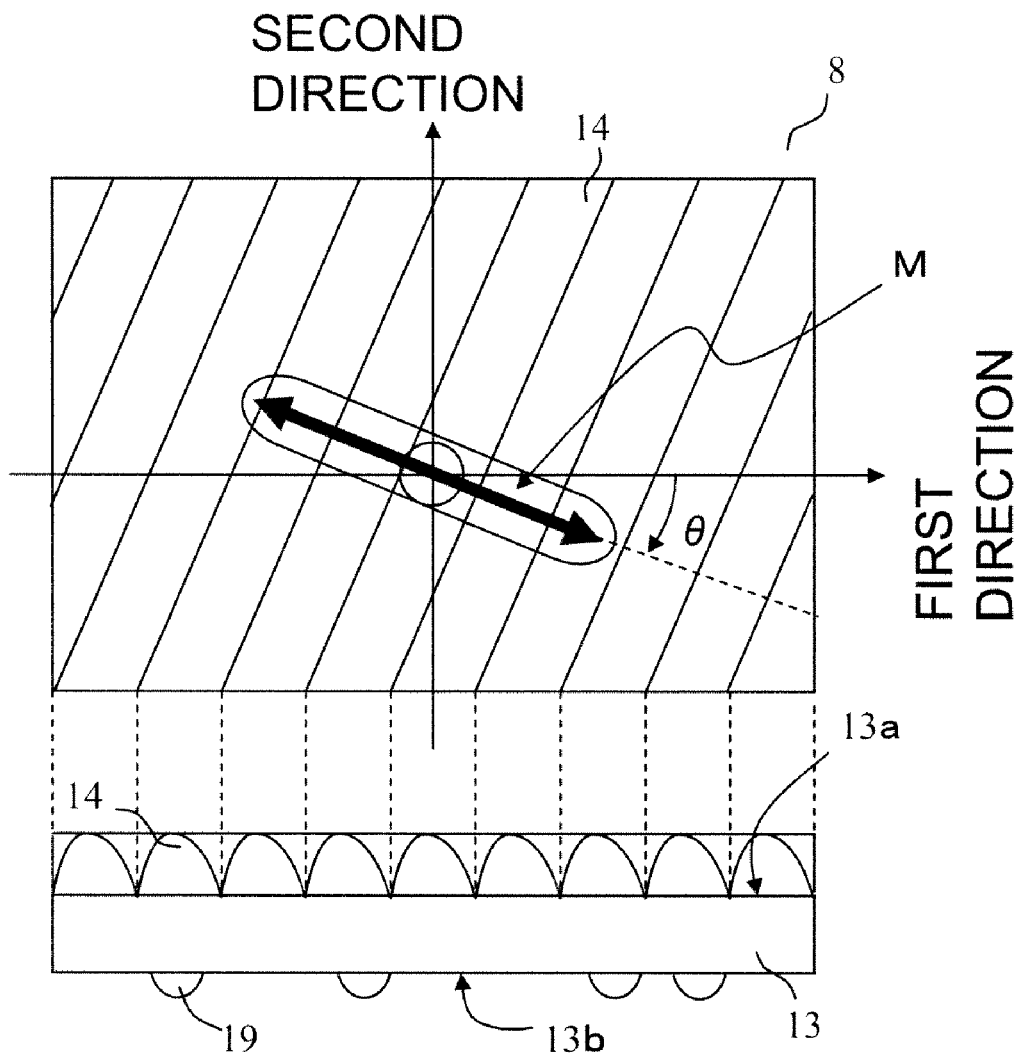
FIG. 15 is a top view and a sectional view of a blurring structure according to a second embodiment of the present invention.

As illustrated in FIG. 15, with the second embodiment according to the present invention, the convex lenticular lenses 14 are arranged such that the direction in which the convex lenticular lenses 14 are aligned is inclined at the inclining angle $\theta$ with respect to the first direction. Further, although it is possible to match the first direction with one of the screen vertical direction and screen horizontal direction of the display device 1, particularly, the first direction preferably matches with the screen horizontal direction of the display device 1. As described above, the split lenses 24 of the split structure 20 arranged on the emission surface side of the blurring structure 8 preferably extend in the screen horizontal direction of the display device 1, and are aligned in the screen vertical direction. Hence, when the first direction matches with the screen horizontal direction of the display device 1, the intersecting angle of the convex lenticular lenses 14 and split lenses 24 is 90-$\theta$ degrees. In case where the two types of lenses cross, the front surface brightness is the highest when the lenses cross at 90 degrees, so that it is possible to provide the illuminating device 3 of a high brightness and display device 1 having this illuminating device 3 by making the inclining angle $\theta$ small.

As described in the first embodiment according to the present invention, lights are incident on the light guide body 7 from the light sources 6 and, when the light guide body 7 is seen from the viewer side F, the light deflection elements 18 are seen in a dot pattern. Further, when the blurring structure 8 is arranged on the emission surface of the light guide body 7 and is viewed from the viewer side F, lights are linearized and seen in a direction inclined at the angle $\theta$ with respect to the first direction. That is, the convex lenticular lenses 14 formed on the first primary surface of the blurring structure 8 covert and emit part of lights emitted from the light guide body 7 toward the normal direction of the first primary surface 13a, that is, toward the viewer side F, and, when the emitted lights are viewed from the viewer side F, the emitted lights are seen as the linear lights M inclined at the angle θ with respect to the first direction as illustrated in FIG. 15. Meanwhile, although the direction of θ is illustrated downward from the first direction in FIG. 15, θ may be upward from the first direction.

The angle θ formed between the first direction and direction in which the convex lenticular lenses 14 are aligned are determined by relational expressions of following equation 9 and equation 10.

$$P_1 * \sin\theta - D \leq 0 [\text{mm}] \quad \text{(Equation 9)}$$

$$0.5 * P_2 - 2 * L * \sin\theta - D \leq 0.1 [\text{mm}] \quad \text{(Equation 10)}$$

Meanwhile, L is determined according to following equation 11, and the relational expression of equation 12 holds between the angle $\theta_i$ and maximum angle α of the convex lenticular lenses 14.

$$L = t * \tan(\sin^{-1}(\sin\theta_i / n_0)) \quad \text{(Equation 11)}$$

$$\tan\alpha = \frac{\sin\theta_i}{\sqrt{n_1^2 - \sin^2\theta_i} - 1} \quad \text{(Equation 12)}$$

Figure 16:
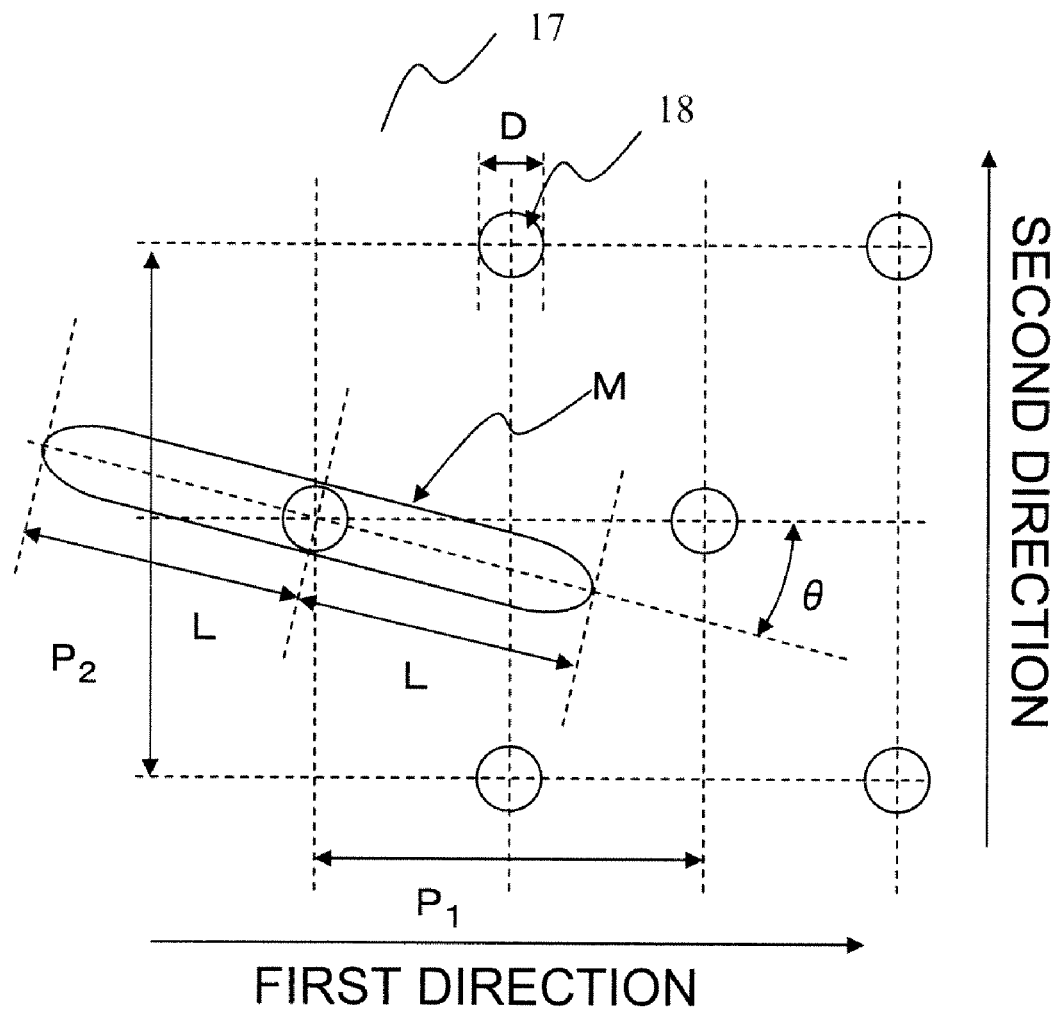
FIG. 16 is a view describing equation 9 to equation 10 according to the present invention.

Equation 9 to equation 12 will be described in detail below using FIG. 16 and FIG. 17. FIG. 16 is a view illustrating that lights of the light deflection elements 18 are linearlized in a direction inclined at the angle θ with respect to the first direction. Meanwhile, when the width of the light deflection elements 18 is D and lights emitted from the light guide body 7 are linearized by the convex lenticular lenses 14 to have the length L in the direction inclined at the angle θ with respect to the first direction, the angle satisfying both of equation 9 and equation 10 is preferably θ.

The length L of light obtained by linearizing lights by the convex lenticular lenses 14 is calculated according to equation 11. Equation 11 will be described using FIG. 17. FIG. 17 is a sectional view of the light guide body 7 and blurring structure 8. Meanwhile, t is the thickness of the light guide body 7, and $n_0$ is the refractive index of the light guide body 7. When the maximum angle in the sectional surface of the convex lenticular lenses 14 is α, the relation between the angle $\theta_i$ and maximum angle α is represented by equation 12. Meanwhile, $n_1$ is the refractive index of the convex lenticular lenses 14.

Figure 17:
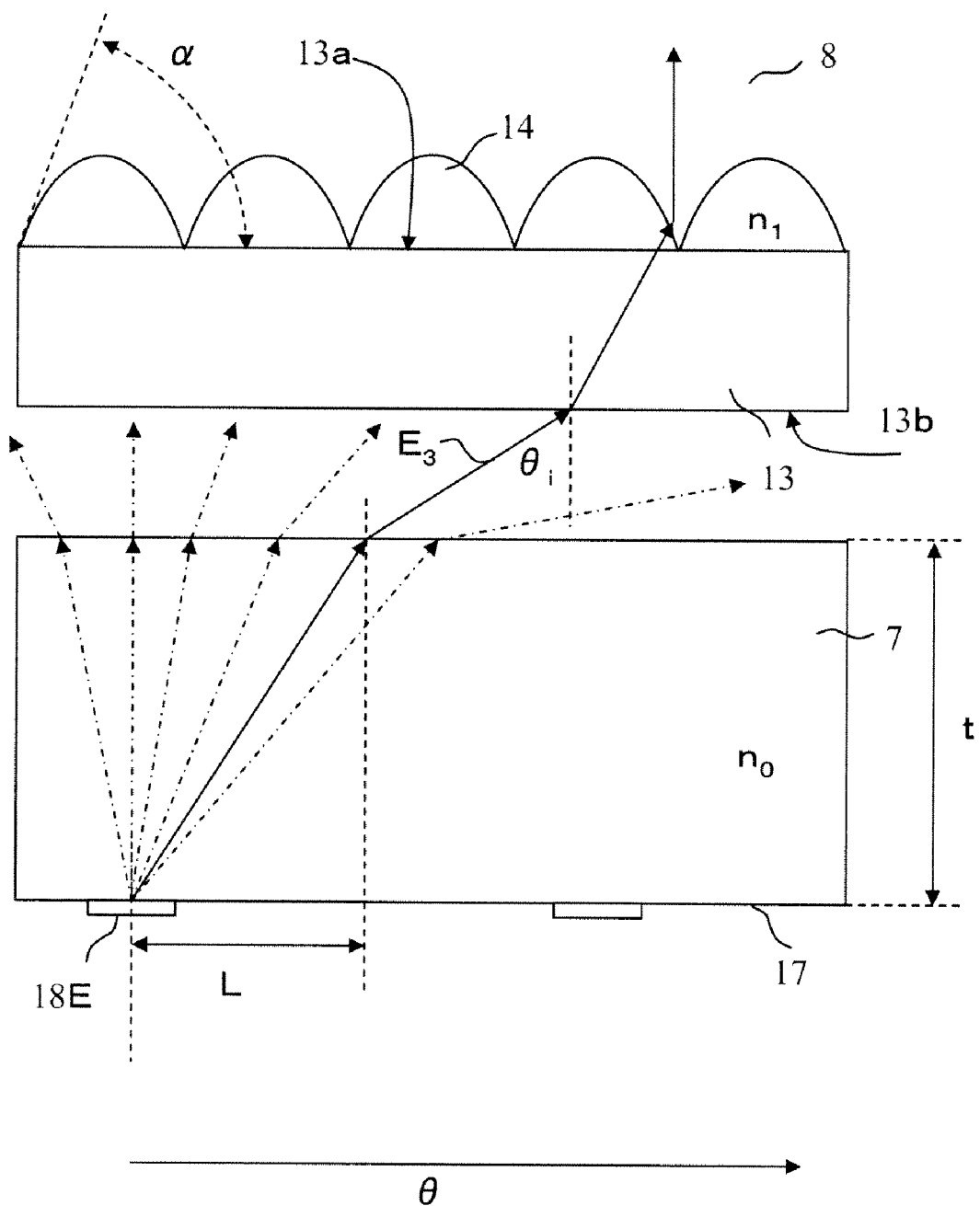
FIG. 17 is a view describing equation 9 to equation 10 according to the present invention.

As illustrated in FIG. 17, the linearization length L represents the distance between the center of the light deflection elements 18E and the emission position of the light $E_3$ in FIG. 17. The light $E_3$ which is one of lights which are incident on light guide body 7, for which paths are deflected by the light deflection elements 18E and are emitted from the emission surface of the light guide body 7, is incident on the blurring structure 8 at the incident angle $\theta_i$, and is converted at the maximum angle α of the convex lenticular lenses 14 in the normal direction of the first primary surface 13a. According to equation 12, the incident angle $\theta_i$ at which lights are converted in the normal direction of the first primary surface 13a is determined according to the maximum angle α of the convex lenticular lenses 14, and the position of light emitted at the angle of the incident angle $\theta_i$ from the light guide body 7 is calculated according to equation 11. More accurately, although the distance between the emission surface of the light guide body 7 and the second primary surface 13b of the blurring structure 8 and the thickness of the base material 13 need to be taken into account, the influence is substantially small compared to the thickness t of the light guide body 7 and description will be made without taking the influence into account. Further, the linear lights M extend in two directions not in one direction, around the center of the light deflection element 18E, and therefore the entire length of the linear lights M is twice L.

Consequently, the relationship between the length L and inclining angle θ calculated as described above, pitch $P_1$ at which the light deflection elements 18 are aligned in the first direction, pitch $P_2$ at which the light deflection elements 18 are aligned in the second direction, and width D of the light deflection elements 18 satisfies both of equation 9 and equation 10, so that it is possible to blur the light deflection elements 18 and provide the illuminating device 3 of a high brightness without unevenness of the brightness.

Figure 18:
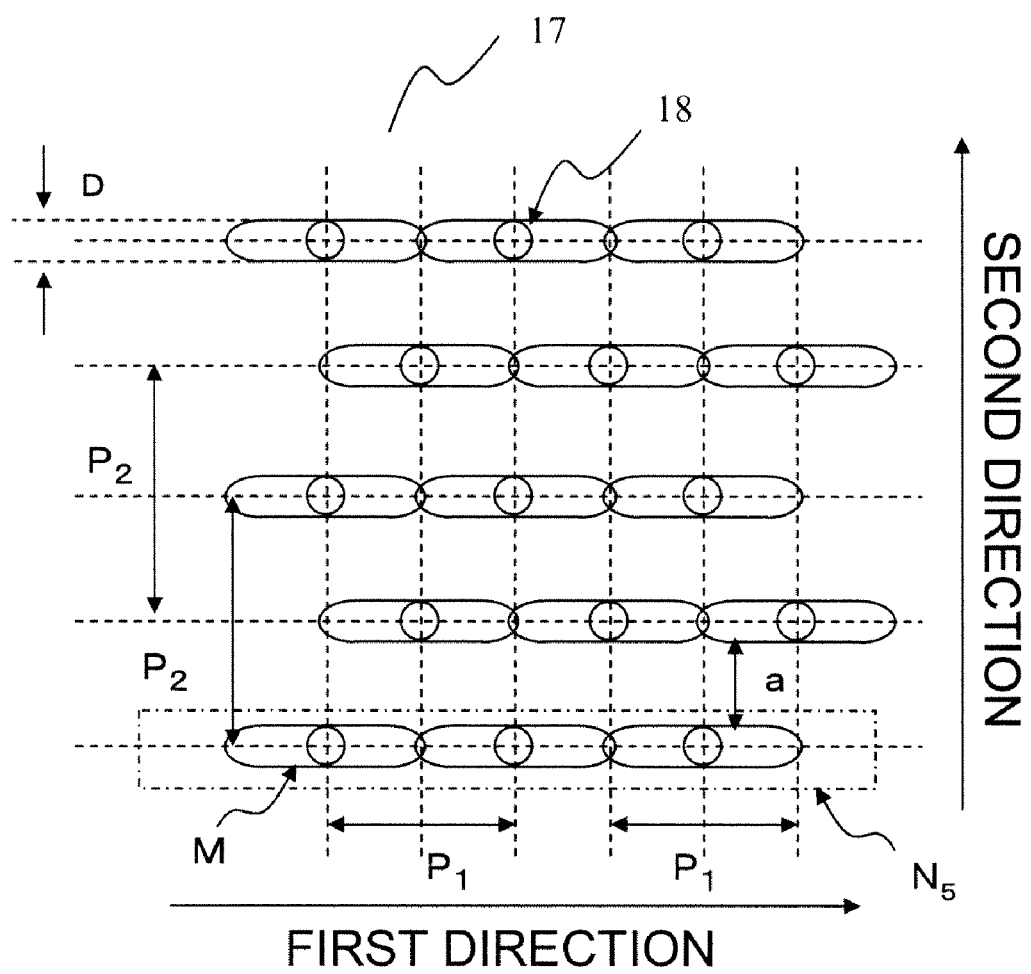
FIG. 18 is a view illustrating an effect of a convex lenticular lens without an inclination.
Figure 19:
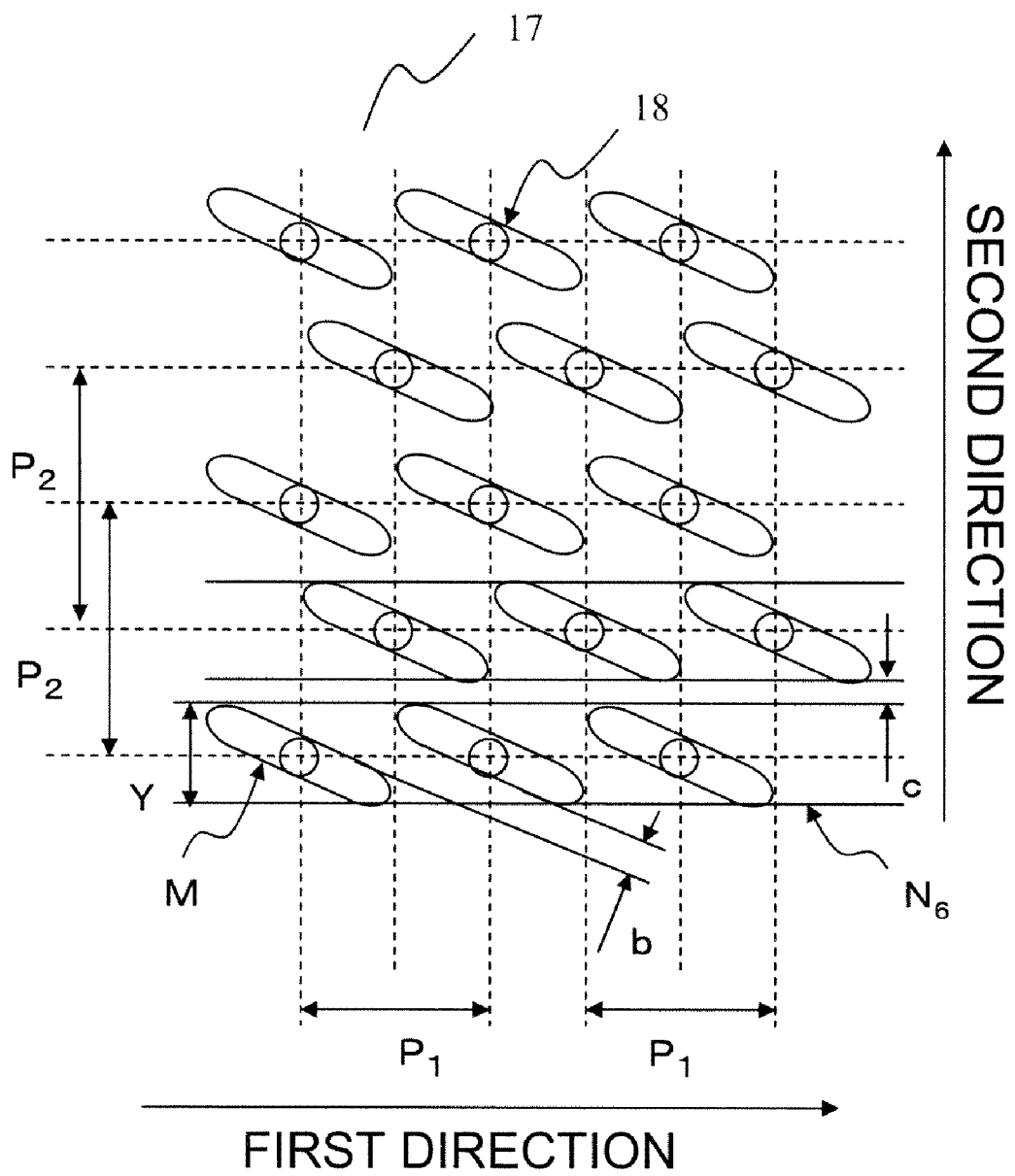
FIG. 19 is a view illustrating an effect of a blurring structure according to the present invention.

Equation 9 to equation 12 will be further described using FIG. 18 and FIG. 19.

FIG. 18 illustrates that the angle θ formed between the linear lights M of the convex lenticular lenses 14 and the first direction is 0 degree. The linear lights M extend in a direction which virtually matches with the first direction, and therefore the linear lights M of the adjacent light deflection elements 18 overlap and the long linear lights $N_5$ extending in the first direction are aligned at the pitch $P_2/2$ in the second direction. Meanwhile, when the width of the light deflection elements 18 is D, although the diameter of the linear lights M is slightly different from D, the diameter almost matches with D. A width a of the second direction in an area in which there is no long linear light $N_5$ is $P_2/2 - D$.

FIG. 19 illustrates the second embodiment of the present invention. The linear lights M extend in a direction inclined at the angle θ from the first direction. Meanwhile, when the width of the light deflection elements 18 is D, b in FIG. 19, that is, a width b between linear lights obtained by linearizing lights of the light deflection elements 18 adjacent in the first direction, in the angle θ direction, is calculated from the side of equation 9. The inventors of the present invention found that, when this value is equal to or less than 0 mm (0 or minus value in equation 9), the linear lights M adjacent in the first direction overlap, so that it is possible to use the linear lights M as long linear lights $N_6$ which have the width Y in the second direction and which extend in the first direction. That is, the linear lights M are converted into the linear lights $N_6$ having a wider width than the linear lights $N_5$ having the width D illustrated in FIG. 17, so that blurring performance for the light deflection elements 18 substantially improves.

Meanwhile, when the value of equation 9 exceeds 0 mm, the linear lights M inclined at the angle θ is recognized as single light, and therefore the single light cannot be used as the linear light N having a wide width and blurring performance is not sufficient, and it is not possible to provide the illuminating device 3 of a high brightness without unevenness of the brightness.

Hence, the value of equation 9 is preferably 0 mm or less, and is more preferably −D/5 or less such that at least about 20% or more of an area of the width of the light deflection elements 18 overlap. The linear light M of one light deflection element 18 has a higher brightness when the light deflection elements 18 closer to the center of the line width D.

The long linear lights $N_6$ which are converted by the convex lenticular lenses 14 into the linear lights M inclined at the angle θ from the first direction, have the width Y and extend in the first direction are aligned at pitch $P_2/2$ in the second direction. A distance c between the adjacent linear lights $N_6$ in the second direction is calculated according to the left side of equation 10. The inventors of the present invention found that, when this value is equal to or less than 0.1 mm, it is possible to provide the illuminating device 3 from which a pattern of the light deflection elements 18 is not seen.

Consequently, when both of equation 9 and equation 10 are satisfied, the illuminating device 3 according to the present invention blurs the light deflection elements 18 and has a high brightness without unevenness of the brightness.

Meanwhile, in case where, for example, a white ink having diffusion reflection performance is printed as the light deflection elements 18 formed on the light deflection surface 17 of the light guide body 7, the light deflection elements 18 are generally printed smaller which are provided in two-dimensional alignment in which the light deflection elements 18 are aligned at the pitch $P_1$ in the first direction and are aligned at the pitch $P_2$ in the second direction and are closer to light incident surfaces of the light guide body 7 on which the light sources 6 are disposed, and are printed larger which are farther from the light incident surfaces. Hence, the width D of the light deflection elements 18 is not uniform in the light deflection surface 17, and has a certain distribution range. For example, when the light guide body 7 is viewed from the viewer side F, in the illuminating device 3 in which light sources 6 are disposed on four upper, lower, left and right end surfaces, the light deflection elements 18 are larger when the light deflection elements 18 are closer to the center of the light deflection surface 17 and smaller when the light deflection elements 18 are closer to the four end surfaces. The display device 1 needs to suppress unevenness of the brightness caused by the light deflection elements 18 on the entire screen. Hence, to suppress unevenness of the brightness on the entire screen of the display device 1, it is necessary to sufficiently blur the light deflection elements 18 which are formed near the light sources 6 and have narrower widths, among the light deflection elements 18 of different sizes. Therefore, the width D of the light deflection elements 18 applied to equation 9 and equation 10 is preferably calculated based on the average value of the widths D of the light deflection elements 18 formed near the light sources 6 on the light deflection surface 17. More specifically, it is preferable to find the width D from the average values of the widths D of the light deflection elements 18 in an area corresponding to 5 to 10 pitches (one pitch is $P_1$ in the first direction and $P_2$ in the second direction) from the light deflection elements 18 closest to the light sources 6 to the center of the screen.

Hereinafter, the shape of the convex lenticular lenses 14 which linearlize lights emitted from the light guide body 7 will be described below.

Figure 20:
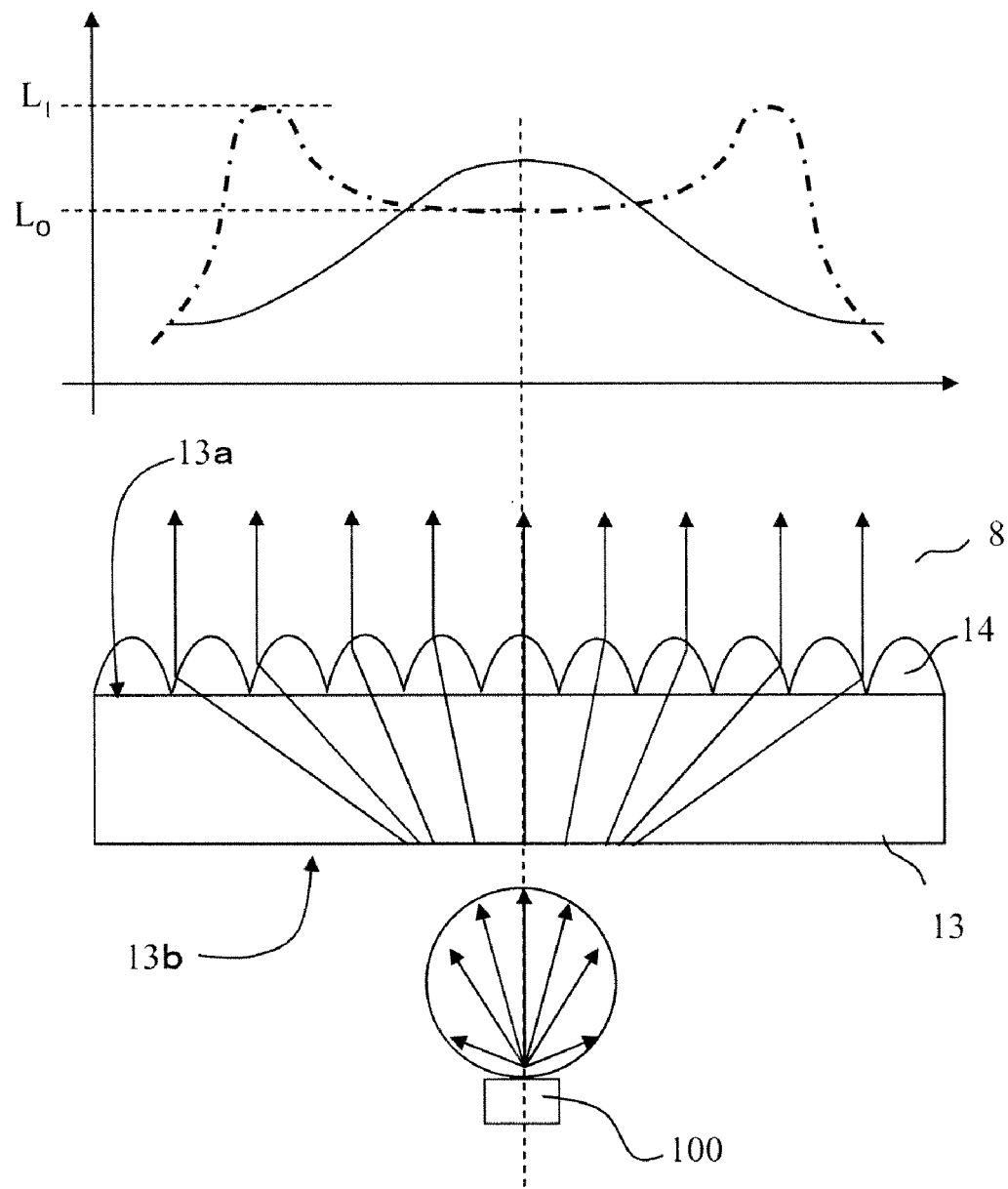
FIG. 20 is a view illustrating an effect when Lambert light is incident on a blurring structure according to the present invention.

The convex lenticular lens 14 is formed with the round top and curved lateral surfaces. In the sectional view of the convex lenticular lens 14 in the alignment direction, the angle formed between the tangent line of the top and the first primary surface 13a is 0 degree, and the tangent line angle increases from the top to the first primary surface 13a. The capacity of the convex lenticular lens 14 which improves performance of blurring the light deflection elements 18 will be described using FIG. 20. A case will be studied where a point light source 100 which emits nearly Lambert light is arranged on the second primary surface 13b of the blurring structure 8. In this case, when the point light source 100 is arranged such that the main axis of emission lights of the point light source and the normal direction of the second primary surface 13b virtually match, lights emitted from the first primary surface 13a in the normal direction of the first primary surface 13a are converted into linear lights $M_0$ which widen directly above the point light source 100 in the alignment direction of the convex lenticular lenses 14. By the way, FIG. 20 illustrates only lights deflected by the convex lenticular lenses 14 in the normal direction of the first primary surface 13a. Although not illustrated, the convex lenticular lenses 14 also emit lights in a diagonal direction in addition to the normal direction with respect to the first primary surface 13a.

As illustrated in FIG. 20, with the convex lenticular lenses 14 according to the present invention, preferably, the peak brightness position of linear lights $M_0$ is directly above the point light source 100 (brightness distribution indicated by the solid line illustrated in FIG. 20). Further, in case where there is the peak brightness position of the linear lights $M_0$ other than directly above the point light source 100 (brightness distribution indicated by the dashed line in FIG. 20), when the brightness directly above the point light source 100 is $L_0$ and peak brightness is $L_1$, $L_1/L_0$ is preferably 200% or less in the convex lenticular lenses 14.

When there is the peak brightness position other than directly above the point light source 100 and $L_1/L_0$ exceeds 200% in the convex lenticular lens 14, even if lights of the point light source 100 are converted into linear lights $M_0$, the light intensity at the peak position becomes very high and causes unevenness of the brightness. Although, with as an extreme example, there are triangular prism lenses, and, when the point light source 100 is arranged in the same manner as described above on the second primary surface 13b side of the lens sheet in which the triangular prism lenses are arranged on the first primary surface 13a and is viewed from the first primary surface side, lights of the point light source 100 are divided into two point lights and blurring performance does not improve.

Most preferably, the peak brightness position of the linear lights $M_0$ is directly above the point light source 100. A plurality of light deflection elements 18 are aligned at nearly equal pitches, so that, when the blurring structure 8 is arranged on the light emission surface of the light guide body 7, lights of a plurality of light deflection elements 18 are linearized, a plurality of linear lights M are produced and part of the linear lights M overlap. In this case, in case of the lenticular lens 14 having a shape in which the peak brightness position of linear lights $M_0$ is directly above the point light source 100, unevenness does not increase even if the linear lights M overlap. However, in case of the convex lenticular lens 14 having a strong peak brightness in a portion other than directly above the point light source 100, the peak brightness position of one light deflection element 18 and peak brightness position of another light deflection element 18 overlap depending on a condition, and the overlapping point is seen as a strong brightness. That is, unevenness of the brightness is produced.

Hence, when there is the peak brightness directly above the point light source 100 or there is the peak brightness other than directly above the point light source 100, the lenticular lenses 14 which expand light linearly such that the ratio of the peak brightness and brightness directly above the point light source is 200% or less, is preferably used in order to improve blurring performance.

The convex lenticular lens 14 which provides the above effect is defined according to following equation 13.

Figure 21:
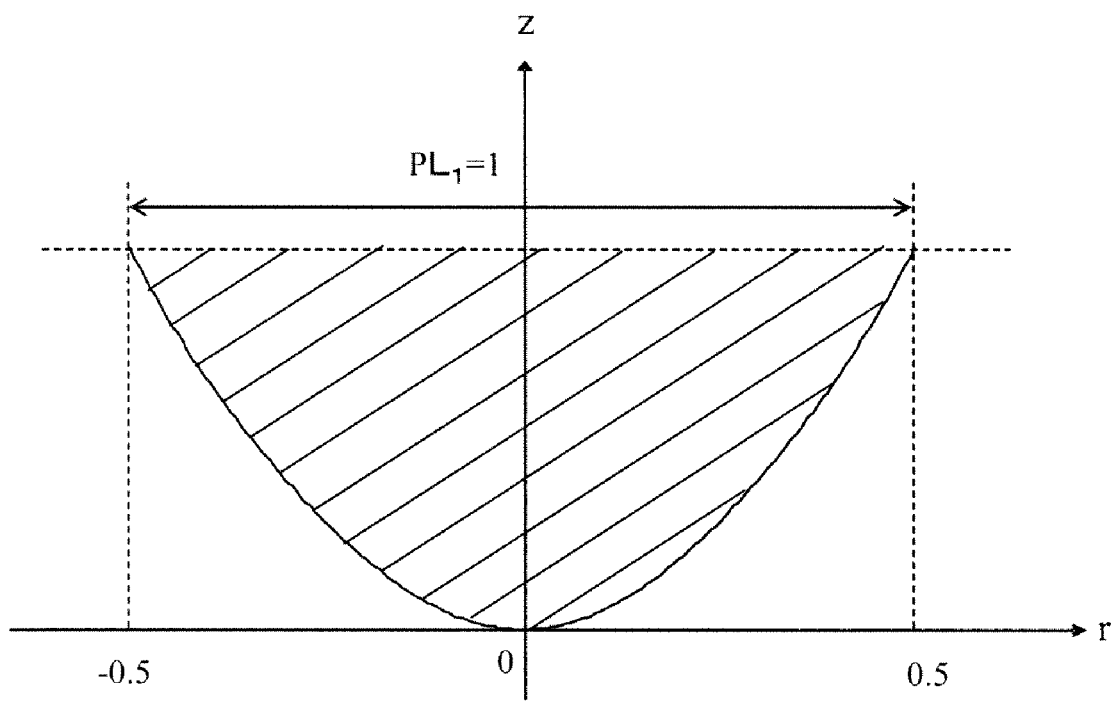
FIG. 21 is a view describing a shape of a convex lenticular lens.

With equation 13, the unit lens pitch of the convex lenticular lens 14 is normalized as 1, and, as illustrated in FIG. 21, z is a position function in the height direction of the convex lenticular lens 14 and r is a width direction position variable. In FIG. 21, the shaded portion is defined as the shape of the convex lenticular lens. Meanwhile, fine adjustment may be made by expanding or reducing the convex lenticular lens 14 having the shape defined according to equation 13 in the height direction or width direction of the lens. When values of k, 1/R, A, B and C are beyond setting values, the convex lenticular lens 14 has a shape which cannot provide a lens effect of increasing blurring performance as described above. Instead, this shape is not preferable because, although the blurring performance increases, light condensing performance decreases.

$$z = \frac{r^2/R}{1+\sqrt{1-(1+k)(r/R)^2}} + Ar^2 + Br^4 + Cr^6 \quad \text{(Equation 13)}$$

where $-1 \le k \le 1$ $-10 < 1/R < 10$ $-5 < A < 5$ $-30 < B < 30$ $-30 < C < 30$ The shape of the convex lenticular lens 14 will be further described in detail using FIG. 22.

FIG. 22 is a sectional view of the convex lenticular lens 14 in the alignment direction. The unit lens pitch is represented by $PL_1$, the height $TL_1$, the maximum angle with respect to the first primary surface 13a α, and the top fitting curvature radius $RL_1$.

Meanwhile, the top fitting curvature radius $RL_1$ represents the curvature radius at the top of the convex lenticular lens 14 having an aspheric shape and is defined as a curvature radius in 10% of the area with respect to the unit lens pitch $PL_1$.

Further, the maximum angle α is as described above formed between the line connecting the point Pa at which the convex lenticular lens 14 contacts the first primary surface 13a and an arbitrary point Pb going toward the top from the point Pa, and the first primary surface 13a.

In this case, the top fitting curvature radius $RL_1$ is less than ½ fold with respect to the unit lens pitch $PL_1$. That is, the convex lenticular lens 14 preferably has an aspheric lens shape in which the curvature radius of the top is smaller than the spherical lens. This is because light condensing performance of the convex lenticular lens 14 improves.

By contrast with this, it is not preferable to make the curvature radius of the top too small because the convex lenticular lens 14 has an aspheric surface shape having a very high unit lens height $TL_1$, thereby decreasing light condensing performance and covering blurring performance. Hence, the top fitting curvature radius $RL_1$ is preferably 0.1 fold or more compared to the unit lens pitch $PL_1$.

Further, the unit lens height $TL_1$ is preferably 0.3 fold or more and 1 fold or less compared to the unit lend pitch $PL_1$. This is because, when the unit lens height $TL_1$ is less than 0.3 fold, light condensing performance is low, and, when the unit lens height $TL_1$ is 1.0 fold or more, not only light condensing performance but also blurring performance become low.

As a result of the study of the optical simulation conducted by the inventors of the present invention, the inventors found that the lens shape is optimal in which the top fitting curvature radius $RL_1$ for providing both of higher light condensing performance and higher blurring performance is set in the range between 0.15 fold and 0.35 fold compared to the unit lens pitch $PL_1$ and the unit lens height $TL_1$ is set in the range between 0.4 fold and 0.7 fold compared to the unit lens pitch $PL_1$.

Figure 23:
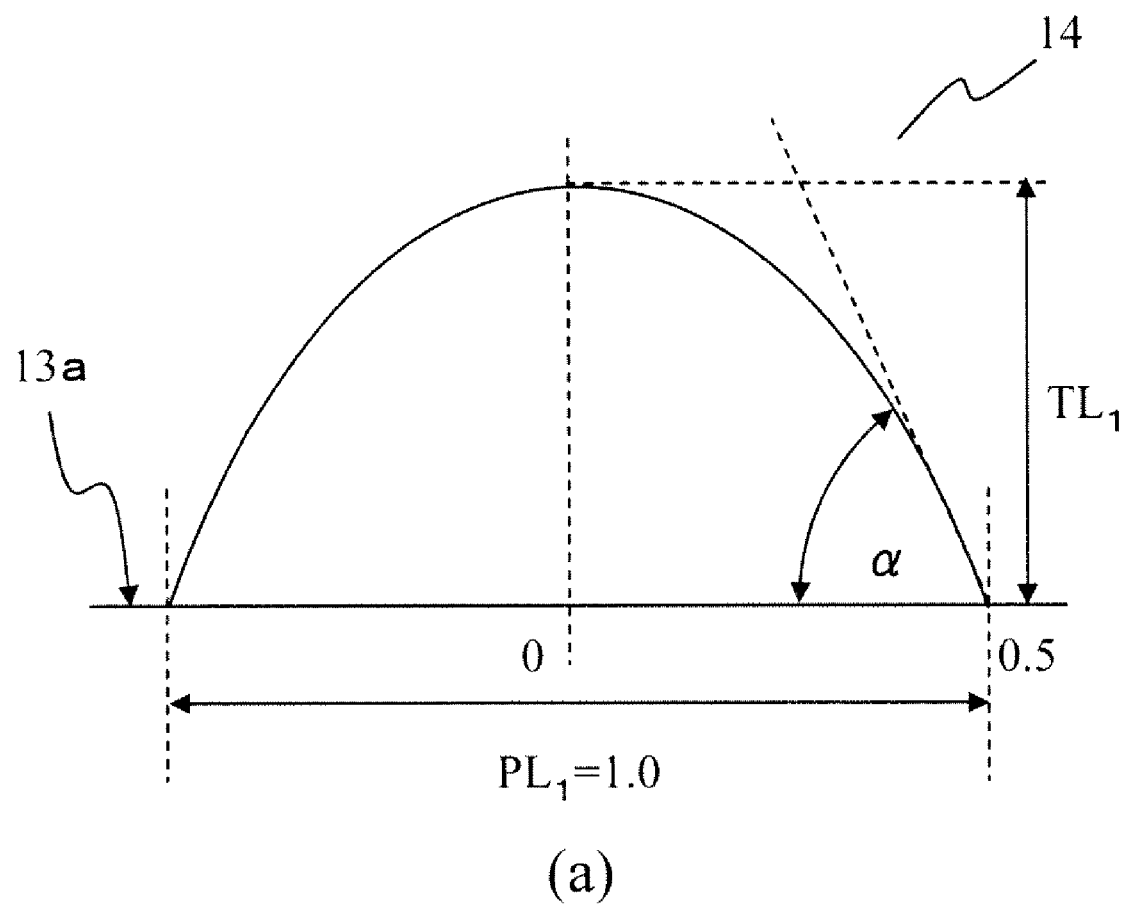
FIG. 23A is a view describing a shape of a convex lenticular lens.
FIG. 23B is a view describing a shape of a convex lenticular lens.
Figure 23:
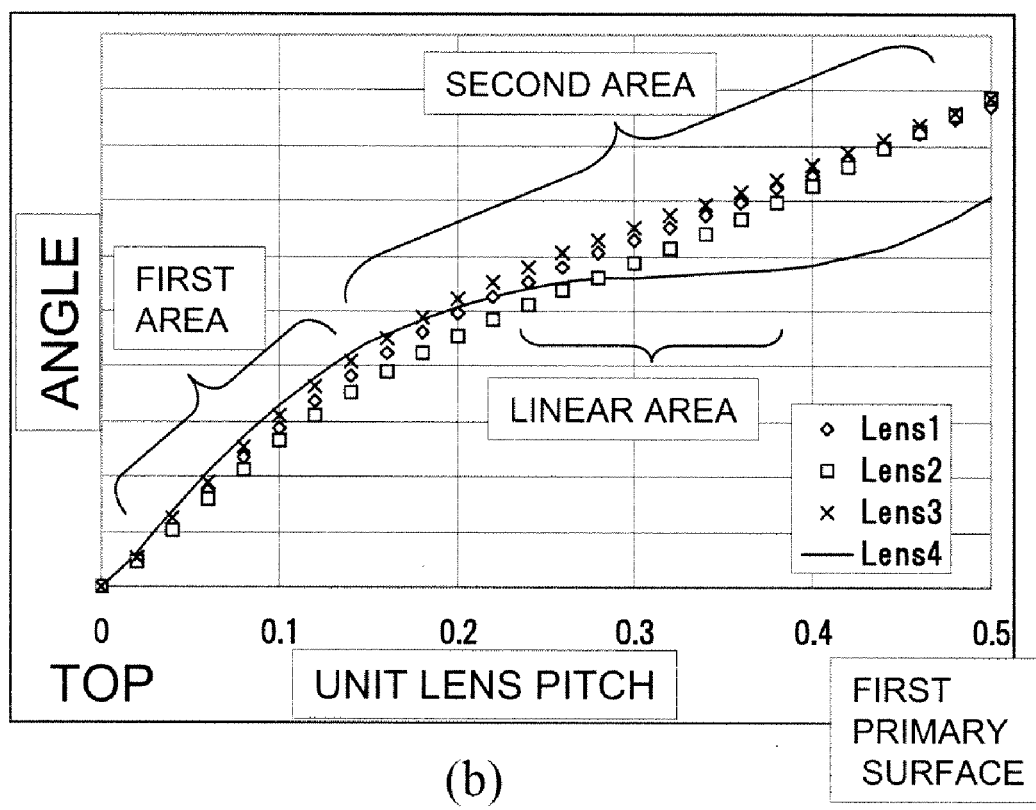

As illustrated in FIG. 23A, the convex lenticular lens 14 according to the present invention has a convex curved shape in which the angle formed between the tangent line at each point in the sectional shape and first primary surface 13a is about 0 degree at the top, the angle increases toward the first primary surface 13a and the maximum angle is α.

Meanwhile, FIG. 23B illustrates a graph in which the angle formed between the tangent line at each point in the sectional shape and the first primary surface is the vertical axis, and the position of the convex lenticular lens 14 in the pitch direction is the horizontal axis. 0 on the horizontal axis in the graph is the position of the top of the unit lens, and 0.5 on the horizontal axis is a point at which the curved lateral surface of the unit lens reaches the first primary surface 13a.

FIG. 23B illustrates some examples of the lenticular lens 14 according to the present invention as a graph. With Lens 1 and Lens 3, for the convex lenticular lenses 14 which provide high light condensing performance and high blurring performance, angles formed between the tangent line at each point reaching the first primary surface 13a from the top and the first primary surface 13a are plotted. By contrast with this, with Lens 4, for a lens which provides high light condensing performance and which has insufficient blurring performance, an angle formed between the tangent line at each point reaching the first primary surface 13a from the top and the first primary surface 13a is plotted.

The convex lenticular lens 14 which provides high light condensing performance and high blurring performance is formed with a first area having a high change rate of the angle on the top side, and a second area having a low change rate of the angle on the first primary surface side. Further, there is no area in which the inclination of the graph becomes nearly 0 illustrated in FIG. 23B. That is, with a curved shape, there is no shape similar to a line between the top and first primary surface 13a, and, every portion is curved and the curvature radius is smaller toward the top. Further, by forming the first area having a high change rate of the angle on the top side and forming the second area having a low change rate of the angle on the first primary surface side without forming a linear area, the lenticular lens 14 is formed as described above which has a function of converting lights of the light deflection elements 18 of a point pattern into the linear lights M which increase blurring performance, so that it is possible to provide both of high light condensing performance and high blurring performance.

By contrast with this, referring to Lens 4 which is plotted by the solid line in the graph in FIG. 23B, there is a linear area. This lens shape is not preferable because, although light condensing performance is high, blurring performance is not high. Preferably, when the derivative value of the graph illustrated in FIG. 23B is taken, with the first area having a high change rate of the angle, the change of angle per 1% of the width of the unit lens changes within the range between 1.5 degrees and 4 degrees and, with the second area having a low change rate of the angle, the change of the angle per 1% of the width of the unit lens is settled in the range between 0.5 degrees and 1.5 degrees. The area in which the change of the angle per 1% of the width of the unit lens goes below 0.5 degrees has a small change of the angle, that is, becomes a nearly linear area, thereby decreasing blurring performance.

Further, the maximum angle α of the convex lenticular lens 14 is a critical factor which increases blurring performance of the blurring structure 8 with respect to the light deflection elements 18. In order to provide high blurring performance, the maximum angle α is preferably 50 degrees or more, and more preferably 60 degrees or more. According to equation 9, when the maximum angle α of the convex lenticular lens 14 is greater, the length L of the linear lights M converted by the convex lenticular lens 14 in the normal direction of the first primary surface becomes longer. When the length L of the linear light M is longer, it is possible to provide high blurring performance even if the angle θ formed between the direction of the linear light M and the first direction is made smaller. When the angle θ formed between the linear light M and the first direction is smaller, the brightness of the illuminating device 3 increases, so that it is preferable to set the angle θ to the minimum angle which makes it possible to sufficiently blur the light deflection elements 18.

By the way, although the factor for providing high blurring performance is also influenced by, for example, the alignment pitch of the light deflection elements 18 and thickness of the light guide body 7, as a result of tests conducted by the inventors of the present invention using various light guide bodies 7, when the maximum angle α of the convex lenticular lens 14 is 60 degrees or more, it is possible to provide the blurring structure 8 which provides high blurring performance by setting the angle θ to 5 to 10 degrees. By contrast with this, when the angle θ is increased, the brightness of the display device 1 decreases. According to an example, when the front surface brightness of the display device 1 in case of θ=0 degree is 1.00, the front surface brightness is 0.99 in case of θ=10 degrees, 0.98 in case of θ=15 degrees, 0.96 in case of θ=20 degrees and 0.93 in case of θ=30 degrees. Hence, the shape of the convex lenticular lens 14 is determined such that the angle θ is preferably between 5 degrees and 15 degrees or −5 degrees and −15 degrees, and the angle θ is more preferably between 5 degrees and 10 degrees or −5 degrees and −10 degrees.

Further, it is not preferable to make the maximum angle α of the convex lenticular lens 14 50 degrees or less because the angle θ cannot be equal to or less than 15 degrees. By contrast with this, when the maximum angle α of the convex lenticular lens 14 exceeds 80 degrees, although the blurring performance is increased, there is a problem that the light condensing performance of the convex lenticular lens 14 decreases and, as a result, the brightness of the display device 1 decreases. Consequently, the maximum angle α is preferably 80 degrees or less.

Although a method has been described above which linearizes and splits lights of the light deflection elements 18 by means of the blurring structure 8 and split structure 20 to improve blurring performance for the light deflection elements 18, it is possible to improve blurring performance for the light deflection elements 18 by further providing the diffusing optical sheet 28 having the Haze value equal to or more than 30% and equal to or less than 85%. That is, although it is possible to improve blurring performance by linearizing and splitting lights of the light deflection elements 18 seen in a point pattern by means of the blurring structure 8 and split structure 20, when the alignment pitch of the light deflection elements 18 is great, for example, at least when the alignment pitch $P_1$ in the first direction and the alignment pitch $P_2$ in the second direction exceed 1 mm, there are cases where the linear lights M of the blurring structure 8 and split structure 20 are seen. In this case, by further providing the diffusing optical sheet 28 having the Haze value equal to or more than 30% and equal to or less than 85% and slightly diffusing linear lights, it is possible to reduce linear unevenness of the brightness and further improve blurring performance for the light deflection elements 18. In addition, the Haze value is a measurement value according to JIS K7136.

Further, although the split structure 20 which provides high light condensing performance has, for example, a triangular prism lens shape, while the triangular prism lens shape provides high light condensing performance, there is a problem that side lobes are produced. Meanwhile, by providing the diffusing optical sheet 28 having the Haze value equal to or more than 30% and equal to or less than 85%, it is possible to diffuse emission lights and provide an effect of suppressing side lobes.

Further, when the pitches of the convex lenticular lenses 14 and split lenses 24 forming the blurring structure 8 and split structure 20 are close to the pixel pitch of the image display element 2 of the display device 1, there is a concern that the moire interference pattern is produced. However, with the display device 1 according to the present invention, the diffusing optical sheet 28 having the Haze value equal to or more than 30% and equal to or less than 85% is arranged between the liquid crystal panel 2, and the blurring structure 8 and split structure 20. Consequently, the periodic structures of the blurring structure 8 and split structure 20 are scattered by the diffusing function, so that it is possible to prevent occurrence of a moire interference pattern. Further, by sandwiching the diffusing optical sheet 28 between the blurring structure 8 and split structure 20, and the image display element 2, a spatial distance corresponding to at least the thickness of the optical sheet 28 is produced between the blurring structure 8 and split structure 20, and image display element 2, so that it is possible to further suppress a moire interference pattern.

The diffusing optical sheet 28 having the Haze value equal or more then 30% and equal to or less than 85% includes a diffusion layer attached polarizing separation reflection sheet represented by DBEF-D (3M company) as described above. Further, with another example, the diffusing optical sheet 28 includes, for example, a prism protection upper diffusion film. When the Haze value is higher, diffusing performance becomes higher, and therefore the Haze value of the diffusing optical sheet 28 is preferably equal to or more than 30%. By contrast with this, there is a problem that, when diffusing performance is increased, the brightness significantly decreases. Hence, the Haze value is preferably 85% or less. The Haze value is more preferably 80% or less.

With the display device 1 according to the present invention, although the direction in which the triangular prism lenses 24 forming the split structure 20 can be selected from one of the vertical field-of-view direction or horizontal field-of-view direction of the display device 1, the triangular prism lenses 24 are preferably aligned in the vertical field-of-view direction of the screen when the viewer looks at the display device 1 in particular. That is, the second direction and the vertical field-of-view direction of the screen of the display device 1 preferably match.

Generally, although the display device 1 in general is demanded to have a vertical field of view and horizontal field of view of a certain range, a large size display device 1 in particular is demanded to have a wider horizontal field of view particularly for use in a television. The triangular prism lens 24 provides higher light condensing performance and provides a narrower field of view. Consequently, although the vertical field of view narrows by aligning the triangular prism lenses 24 in the vertical field-of-view direction, it is possible to provide high light condensing performance while maintaining a wide horizontal field of view.

As illustrated in FIG. 2, the light deflection elements 18 formed on the light deflection surface 17 of the light guide body 7 forming the display apparatus 1 according to the present invention are formed in two-dimensional alignment in which the light deflection elements 18 are arranged at the pitch $P_1$ in the first direction and are arranged at the pitch $P_2$ in the second direction. In this case, the ratio of $P_1$ and $P_2$ is preferably set to the range of $1.4<P_2/P_1<2.2$ when the pitch $P_2$ in the second direction is greater than the pitch $P_1$ in the first direction, or to $1.4<P_1/P_2<2.2$ when the pitch $P_2$ in the second direction is smaller than the $P_1$ in the first direction. Further, hexagonal arrangement is preferably provided such that the triangular shape connecting three adjacent light deflection elements 18 is a nearly regular triangle. That is, $P_1/P_2$ or $P_2/P_1$ is about 1.73.

By making arrangement of the light deflection elements 18 similar to hexagonal arrangement, the distances between the light deflection elements 18 become uniform without being significantly different in the vertical direction, horizontal direction and oblique direction in the plane of the light deflection surface 17, so that it is possible to make unevenness uniform.

Although the first direction and second direction in which the light deflection elements 18 are aligned can be arbitrarily selected with respect to the screen vertical direction and horizontal direction of the display device 1, with another example, the first direction and second direction may be inclined at the angle θ with respect to the vertical direction and horizontal direction. In this case, the direction in which the convex lenticular lenses 14 extend is set to one of the vertical direction or horizontal direction of the display device 1. When the direction in which linear lights of the convex lenticular lenses 14 forming the blurring structure 8 according to the present invention and the first direction in which the light deflection elements 18 are aligned are inclined at the angle θ, the above described blurring performance can be provided, so that the convex lenticular lenses 14 or light deflection elements 18 may be aligned in the vertical direction or horizontal direction of the display device 1.

Figure 24:
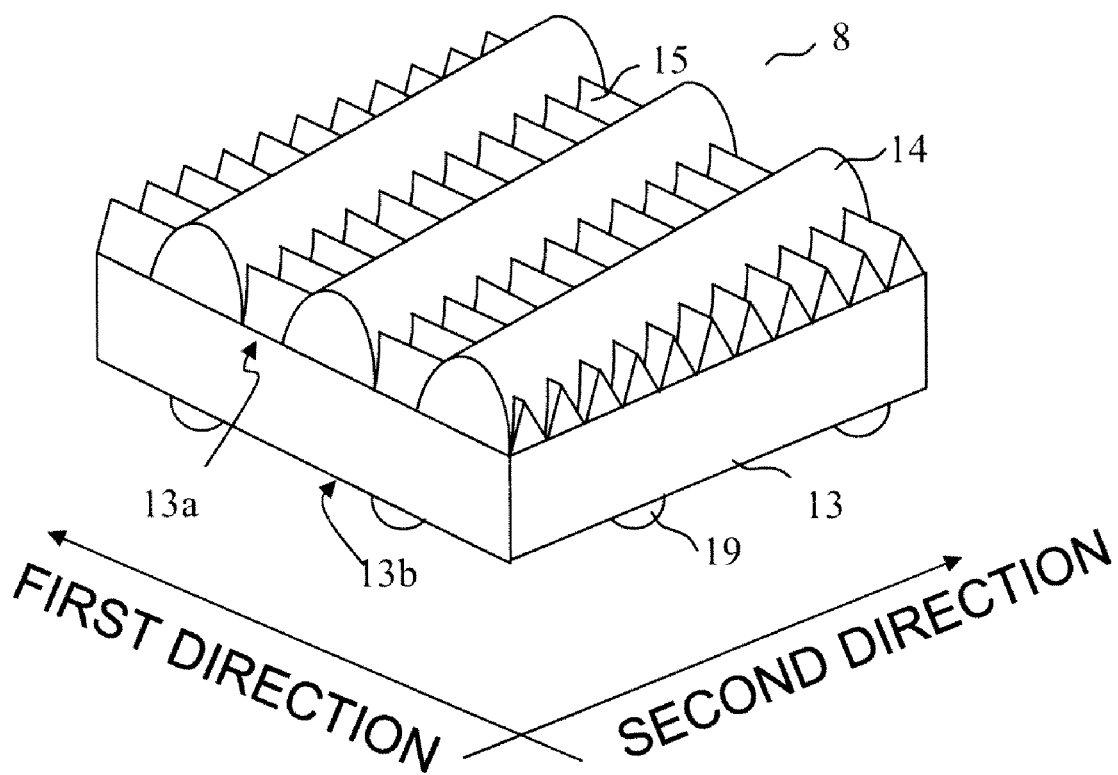
FIG. 24 is a perspective view illustrating another example of a blurring structure.

Although the blurring structure 8 according to the present invention has the linear lenses 14 on the first primary surface 13*a*, the blurring structure 8 may further have second linear lenses 15 crossing the linear lenses 14. In this case, the crossing angle may be 90 degrees, and the light deflection elements 18 may also be aligned in parallel with the second direction. As illustrated in FIG. 24, the second linear lenses 15 are preferably arranged to fill the gaps between a plurality of linear lenses 14. The second linear lens 15 has a triangular prism lens shape. This is because it is possible to increase blurring performance by means of the linear lenses 14 and increase light condensing performance in the front direction by means of the second linear lenses 15. Further, the curved prism lens having curved lateral surfaces may be used for the second linear lenses 15. The curved prism lens provides both of high light condensing performance and diffusing performance, and further improves blurring performance by high diffusing performance while increasing the front surface brightness. With the curved lateral surface of the curved prism lens, the angle formed between the tangent line at each point on the curved lateral surface and the first primary surface 13 of the blurring structure 8 preferably changes in the range between 20 degrees and 70 degrees, and more preferably changes in the range between 60 degrees and 30 degrees. When the range goes below 20 degrees, light diffusing performance and light condensing performance decrease, and, by contrast with this, when the range exceeds 70 degrees, while diffusing performance increases, light condensing performance decreases. However, when the rate the second linear lenses 15 occupy in the area of the first primary surface 13*a* increases, blurring performance of the linear lenses 14 decreases. Consequently, the angle is adequately selected based on blurring performance and light condensing performance required for the display device 1 according to the present invention. The rate the second linear lenses 15 occupy in the area of the first primary surface 13*a* is preferably 60% or less, and more preferably 30% or less.

Figure 25:
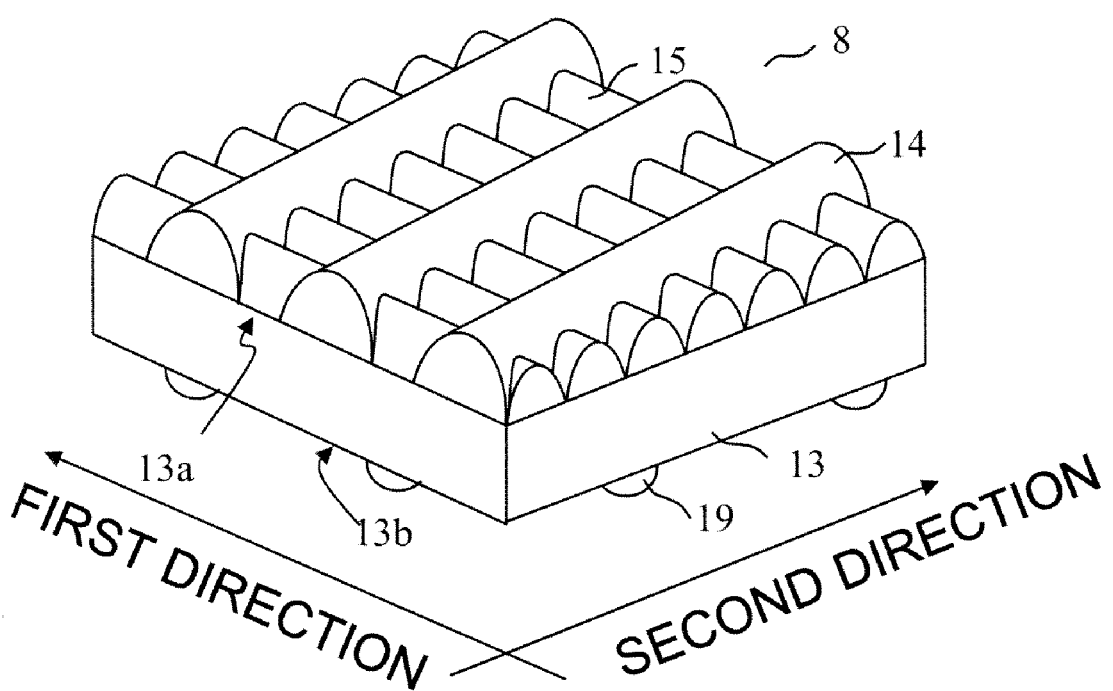
FIG. 25 is a perspective view illustrating another example of a blurring structure.

With another example, the second linear lens 15 has a lenticular lens shape as illustrated in FIG. 25. Lights of the light deflection elements 18 are linearized by the second linear lenses 15 in the second direction, so that blurring performance further improves. The lenticular lens shape of the second linear lenses 15 may be the same as the linear lenses 14, or may be a lens shape which is a similar figure of the linear lenses 14. Instead, the lenticular lens shape may have a completely different lens shape.

Figure 26:
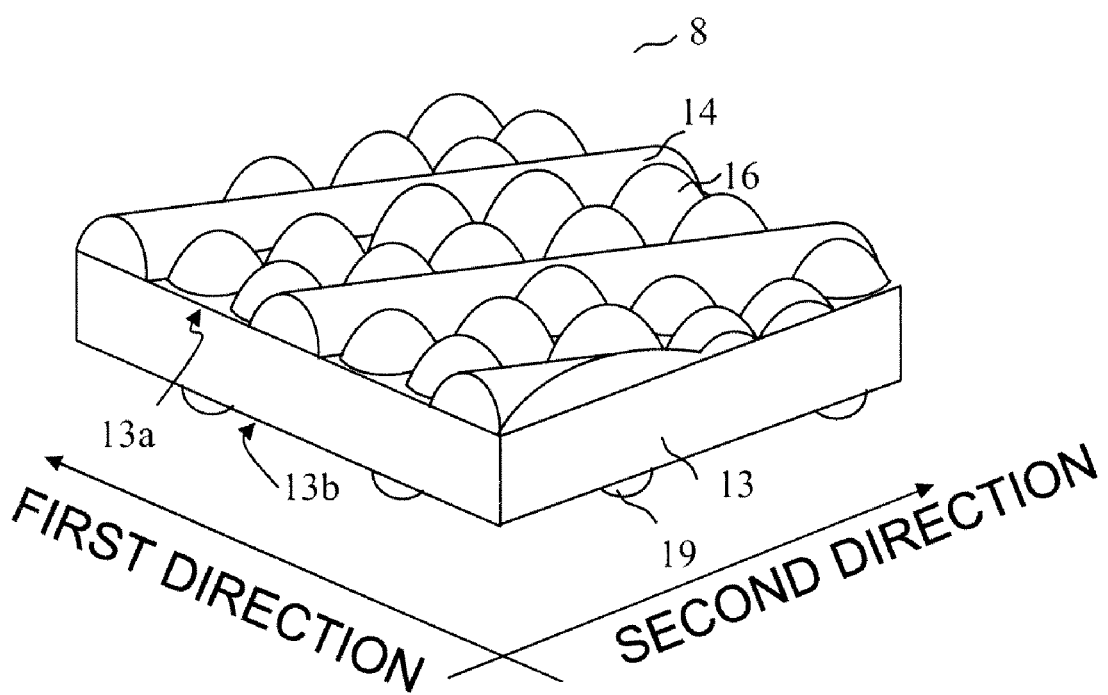
FIG. 26 is a perspective view illustrating another example of a blurring structure.
Figure 27:
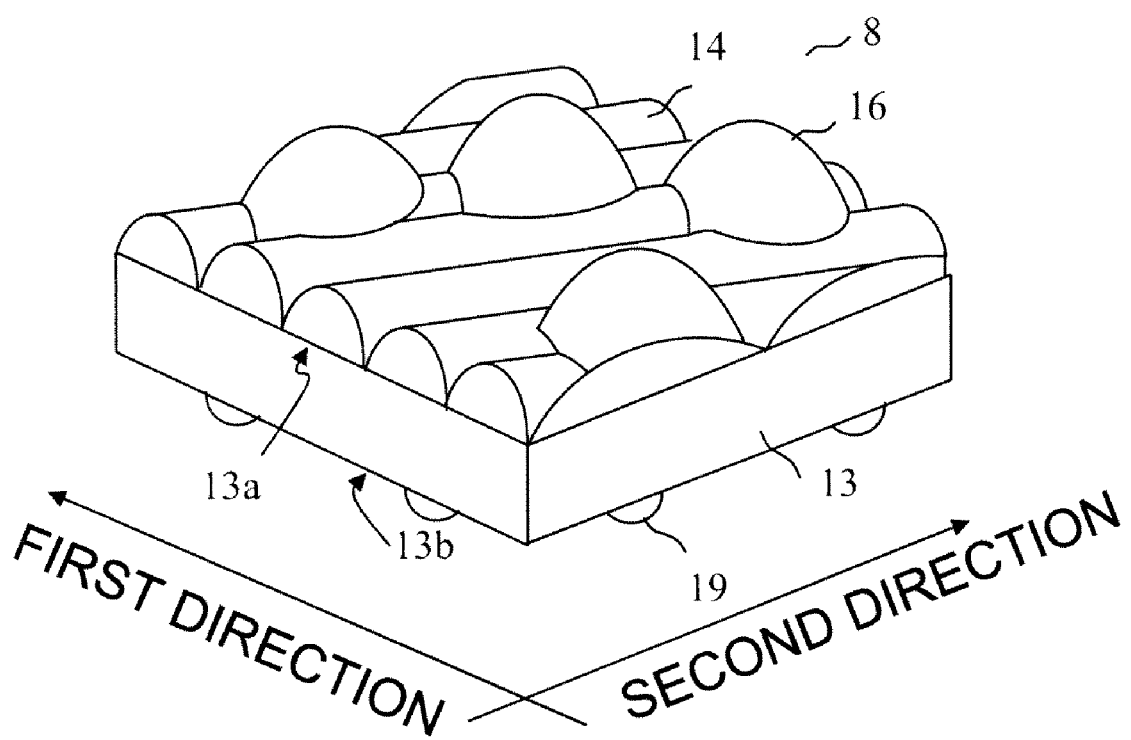
FIG. 27 is a perspective view illustrating another example of a blurring structure.
Figure 28:
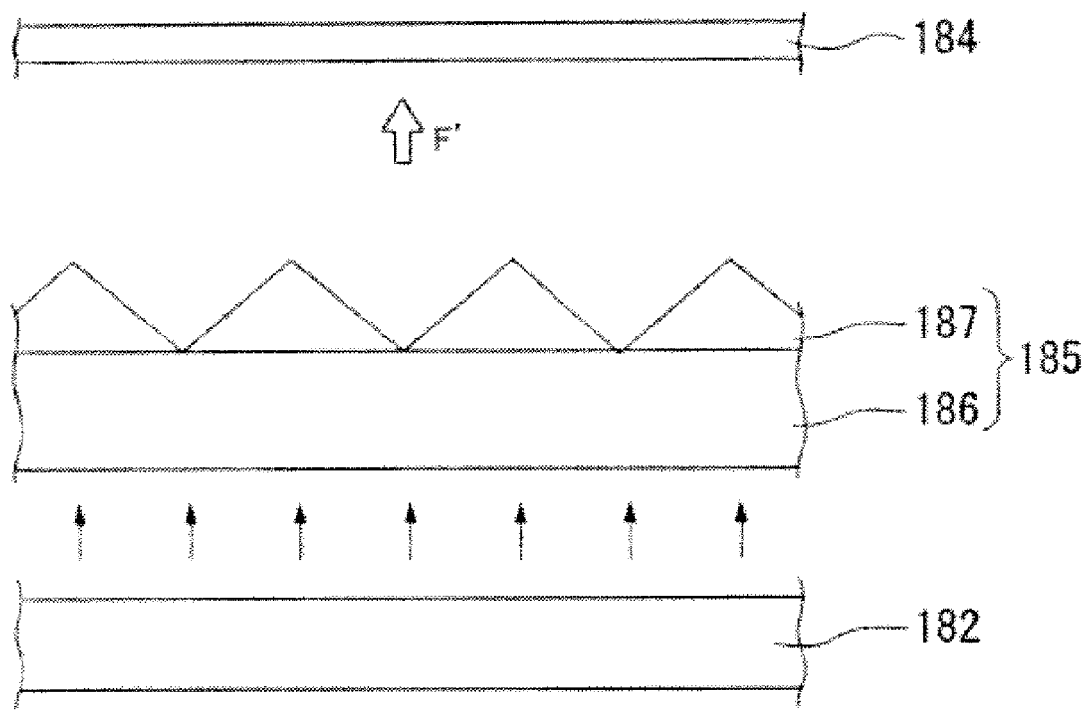
FIG. 28 is a sectional schematic view illustrating an example of arrangement of a BEF.
Figure 29:
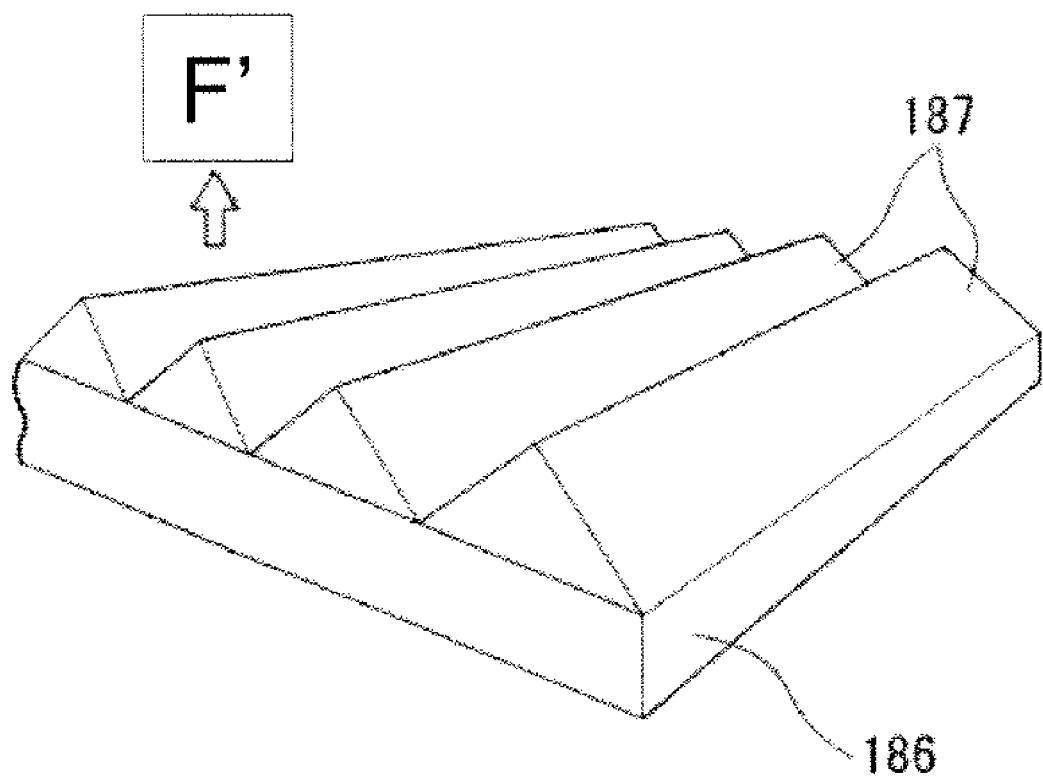
FIG. 29 is a perspective view of a BEF.
Figure 30:
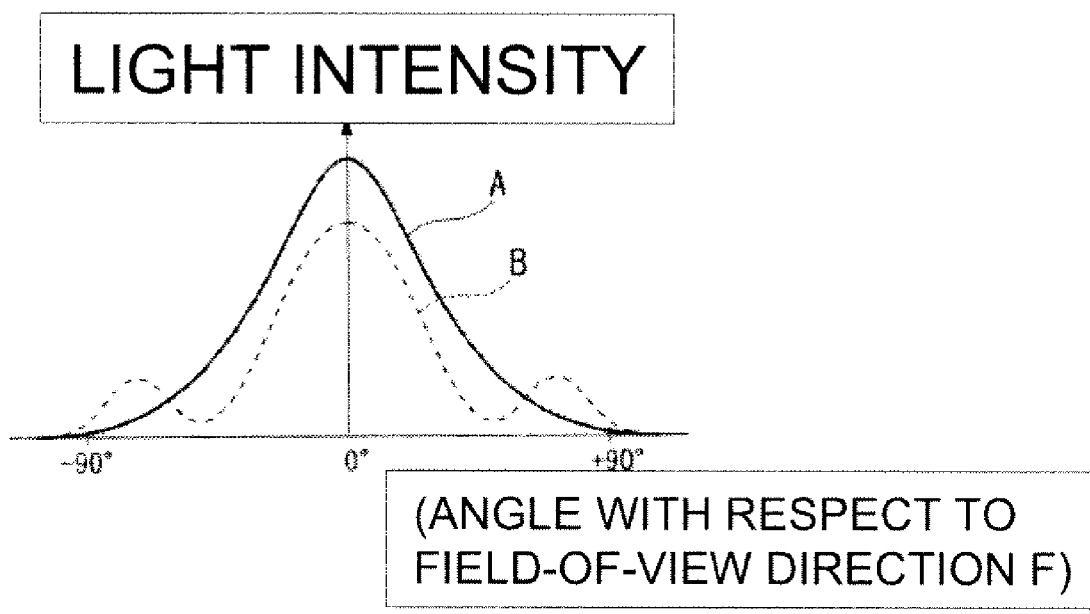
FIG. 30 is a graph illustrating a relationship between a light intensity and an angle with respect to a field-of-view direction.

With another embodiment of the blurring structure 8 according to the present invention, as illustrated in FIG. 26, microlenses 16 may be formed in gaps between the linear lenses 14. Further, as illustrated in FIG. 27, it is also possible to form the microlenses 16 to cover the linear lenses 14. The feature of the microlens 16 includes diffusing light in all directions and condensing light in all directions. Consequently, the linear lenses 14 linearize lights of the light deflection elements 18 at the angle θ with respect to the first direction, and the microlenses 16 diffuse lights in all directions, so that blurring performance improves. By contrast with this, the linear lenses 14 exercise light condensing performance in the one direction, and the microlenses 16 exercise light condensing performance in all directions. With the combination of the linear lenses 14 and microlenses 16, the microlenses 16 are preferably formed covering the linear lenses 14 as illustrated in FIG. 27 in particular. The microlenses 16 arranged in a dot pattern improve friction resistance in addition to optical characteristics such as blurring performance and light condensing performance.

The rate the microlenses 16 occupy in the area of the first primary surface 13*a* of the blurring stricture 8 is preferably 2% or more to provide sufficient friction resistance, and is preferably 10% or more to increase blurring performance. By contrast with this, when the area the microlenses 16 occupy increases, the effect of the linear lenses 14 for improving blurring performance decreases. The area the microlenses 16 occupy is preferably 60% or less, and is more preferably 40% or less.

Although the blurring structure 8 according to the first and second embodiments of the present invention has been in detail described above, the configuration of the illuminating device 3 is not limited to the configuration illustrated in FIG. 1. That is, although examples have been described with the embodiments of the present invention where the blurring structure 8 is arranged on the light guide body 7 and the split structure 20 and diffusing optical sheet 28 are further arranged on the light guide body 7, the configuration is not limited to this. Particularly, by adding the second linear lenses 15 to the blurring structure 8 in addition to the linear lenses 14, blurring performance and light condensing performance increase. Consequently, it is possible to omit the split structure 20. Further, the diffusing optical sheet 28 may be omitted or may be replaced with a diffusing sheet.

With the blurring structure 8 forming the illuminating device 3 according to the present invention, the linear lenses 14 and second linear lenses 15, or the microlenses 16 are molded or integrally formed on the first primary surface 13*a* of the translucent base material 13, and the microlenses 19 are molded or integrally formed on the second primary surface 13*b*, using UV cured resin or radioactive ray cured resin, or by an extrusion molding method, ejection molding method or thermal press molding method which is well known in this technical field, using, for example, PET (polyethylene terephthalate), PC (polycarbonate), PMMA (polymethylmethacrylate), COP (cycloolefin polymer), PAN (polyacrylonitrile copolymer) or AS (acrylonitrile styrene copolymer). The microlenses 19 may be removed from the second primary surface 13b and the second primary surface 13b may be roughened. Further, it is also possible to make the split structure 20 according to the same manufacturing method as the blurring structure 8.

The image display element 2 preferably allows transmission of light and block light in pixel units to display images. As long as the image display element 2 allows transmission of light and blocks light in pixel units to display images, the illuminating device 3 according to the present invention can improve the brightness for the viewer side F, reduce the dependency of the view angle of the light intensity and further display high quality images effectively utilizing light for which visibility of the light deflection elements 18 is reduced.

The image display element 2 is preferably a liquid crystal display element. The liquid crystal display element is a typical element which allows transmission of light and blocks light in pixel units, and can make image quality higher and reduce manufacturing cost compared to other display elements.

Although the illuminating device 3 and display device 1 according to the present invention have been described, the illuminating device 3 according to the present invention is by no means applied only to the display device 1. That is, it is not hard to imagine that it is possible to use the illuminating device having the function of efficiently condensing light emitted from the light sources 6, in, for example, illuminating equipment.

Hereinafter, although the present invention will be described in detail based on the example, the present invention is by no means limited only to the following example.

Example

First, the blurring structure 8 according to the present invention was tested.

The lenticular lenses 14 formed on the first primary surface 13a of the blurring structure 8 were designed according to equation 13. The convex lenticular lens 14 which is shaped such that the lens width $PL_1$ of the unit lens is 50 μm, the lens height $TL_1$ is 28 μm, the top fitting curvature radius is 11 μm, and the maximum angle α is 68 degrees, was used as the first convex lenticular lens 14.

The second convex lenticular lens 14 was shaped such that the lens width $PL_1$ of the unit lens is 50 μm, the lens height $TL_1$ is 24 μm, the top fitting curvature radius is 11.5 μm, and the maximum angle α is 58 degrees.

The third convex lenticular lens 14 was shaped such that the lens width $PL_1$ of the unit lens is 50 μm, the lens height $TL_1$ is 20 μm, the top fitting curvature radius is 21 μm, and the maximum angle α formed with respect to the first primary surface 13a is 68 degrees.

The fourth convex lenticular lens 14 was shaped such that the lens width $PL_1$ of the unit lens is 50 μm, the lens height $TL_1$ is 18 μm, the top fitting curvature radius is 25 μm, and the maximum angle α formed with respect to the first primary surface 13a is 68 degrees.

The fifth convex lenticular lens 14 was shaped such that the lens width $PL_1$ of the unit lens is 50 μm, the lens height $TL_1$ is 33 μm, the top fitting curvature radius is 4.5 μm, and the maximum angle α formed with respect to the first primary surface 13a is 68 degrees.

The sixth convex lenticular lens 14 was shaped such that the lens width $PL_1$ of the unit lens is 50 μm, the lens height $TL_1$ is 22 μm, the top fitting curvature radius is 4.5 μm, and the maximum angle α formed with respect to the first primary surface 13a is 68 degrees.

The above first to sixth convex lenticular lenses 14 and the base material 13 were simultaneously extruded and molded using polycarbonate resin to obtain the blurring structure 8. Meanwhile, a matte surface was formed on the second primary surface 13b of the base material 13.

For the split structure 20, a triangular prism sheet was prepared which was obtained by extrusion molding using polycarbonate resin and has 90 degrees of the apex. With the triangular prism lens, the pitch is 50 μm, the height is 24 μm and the front end is a round shape having about 1 μm of the curvature radius.

Further, for the diffusing optical sheet 28, the DBEF-D of 3M company was prepared.

The light guide body 7 made of acrylic resin and having the thickness of 4 mm was prepared. White diffusing reflection dots are printed on the light deflection surface 17 of the light guide body 7 as light deflection elements, are two-dimensionally aligned at the pitch $P_1$ of about 1.5 mm in the first direction and at the pitch $P_2$ of about 2.6 mm in the second direction, and are aligned in hexagonal arrangement in which the shape connecting the three most adjacent light deflection elements 18 form a nearly regular triangle. On the upper and lower longitudinal end surfaces of the four end surfaces of the light guide body 7 seen from the viewer side F, multiple white LEDs are disposed as the light sources 6, and the white light reflection sheet 5 is further disposed on the light deflection surface 17 of the light guide body 7. Meanwhile, the light sources 6 and light reflection sheet 5 are arranged such that the first direction and the longitudinal sides of the light guide body 7 on which the LEDs 6 are arranged match, and the second direction and the lateral sides of the light guide body 7 match.

The sizes of the light deflection elements 18 formed on the light deflection surface 17 are smaller when the light deflection elements 18 are closer to the longitudinal end surfaces on which the LEDs 6 are arranged and are larger when the light deflection elements 18 are closer to the center of the light deflection surface 17, and the average value D of the widths of the light deflection elements 18 arranged in an area corresponding to 5 pitches of the pitch $P_2$ from the light deflection elements 18 closest to the longitudinal end surfaces to the second direction is about 0.45 mm.

The illuminating device 3 is formed by layering the blurring structure 8 having the first to sixth convex lenticular lenses 14, split structure 20 and DBEF-D28 in order on the light emission surface side of the light guide body 7.

The display device 1 is formed by further disposing the liquid crystal panel 2 on the viewer side of the illuminating device 3. The liquid crystal panel 2 is arranged such that the horizontal field-of-view direction of the display device 2 and first direction match, and the vertical field-of-view direction and second direction match.

By changing the angle formed between the direction of linearization by the first to sixth convex lenticular lenses 14 and the first direction, unevenness of the brightness of the display device 1 and the front surface brightness were evaluated. The front surface brightness was measured using SR-3A (spectral radiance meter) of TOPCON Corporation. The result is illustrated in Table 1 and Table 2

TABLE 1

| | Convex lenticular lens | | | | | |
| | First | | Second | | Third | |
| Angle θ [deg] | Brightness [cd/m²] | Unevenness evaluation | Brightness [cd/m²] | Unevenness evaluation | Brightness [cd/m²] | Unevenness evaluation |
| --- | --- | --- | --- | --- | --- | --- |
| 0 | 482 | X | 492 | X | 462 | X |
| 5 | 480 | X | 489 | X | 461 | X |
| 10 | 479 | ◯ | 487 | X | 458 | ◯ |
| 15 | 469 | ◯ | 479 | ◯ | 454 | ◯ |
| 20 | 465 | X | 472 | X | 450 | X |
| 25 | 458 | X | 463 | X | 446 | X |
| 30 | 452 | ◯ | 454 | ◯ | 441 | ◯ |
| 35 | 439 | X | 438 | X | 435 | X |
| 40 | 426 | X | 424 | X | 431 | X |

TABLE 2

| | Convex lenticular lens | | | | | |
| | Fourth | | Fifth | | Sixth | |
| Angle θ [deg] | Brightness [cd/m²] | Unevenness evaluation | Brightness [cd/m²] | Unevenness evaluation | Brightness [cd/m²] | Unevenness evaluation |
| --- | --- | --- | --- | --- | --- | --- |
| 0 | 431 | X | 498 | X | 502 | X |
| 5 | 430 | X | 494 | X | 497 | X |
| 10 | 428 | ◯ | 490 | X | 494 | X |
| 15 | 425 | X | 482 | X | 484 | X |
| 20 | 421 | X | 475 | X | 476 | X |
| 25 | 418 | X | 464 | X | 463 | X |
| 30 | 413 | ◯ | 451 | ◯ | 449 | X |
| 35 | 410 | X | 438 | X | 435 | X |
| 40 | 406 | X | 418 | X | 412 | X |

Table 1 illustrates evaluation results of the front surface brightness and unevenness when the first convex lenticular lens 14 to the third convex lenticular lens 14 change the angle θ formed between the direction of linearization and the first direction, between 0 degree and 40 degrees. As a comparison, instead of the blurring structure 8, an evaluation result in case where a diffusion film (BS921) of KEIWA Inc is arranged will be described.

Front surface brightness value=429[cd/m²]

There is no unevenness of the brightness caused by the light deflection elements 18, and o given as the unevenness evaluation.

Referring to Table 1, the configuration including the first convex lenticular lens 14 and third convex lenticular lens 14 provided a good result without producing unevenness of the brightness in case where the angle θ is between 10 degrees and 15 degrees and is 30 degrees. It was confirmed that, although, when the angle θ is 10 degrees, the brightness does not substantially change from the case where the angle θ is 0 degree, when the angle θ is 30 degrees, the brightness significantly decreases. However, even when the angle θ is 30 degrees, an effect of enhancing the brightness by about 5% more than the front surface brightness in case where the diffusion film BS912 is arranged was obtained.

With the configuration including the second convex lenticular lens 14, when the angle θ is 15 degrees and 30 degrees, a good result was obtained without producing unevenness of the brightness. The difference between the first convex lenticular lens 14 and third convex lenticular lent 14 is that the maximum angle α of the unit lens is 58 degrees, and therefore the angle θ which does not cause unevenness of the brightness was about 15 degrees.

As a result, the display device 1 having the first convex lenticular lens 14 to the third convex lenticular lens 14 could employ a configuration having equal unevenness of the brightness and obtain a high front brightness compared to the configuration using the conventional diffusion film. The configuration having the first convex lenticular lens 14 in particular had the small angle θ of 10 degrees, provided a high brightness compared to the third convex lenticular lens 14, and, consequently, was the best lens shape. By contrast with this, even when the angle θ is 30 degrees, it was possible to provide the display device 1 which suppresses unevenness of the brightness, and provide an effect of enhancing the front surface brightness by 3% to 5% compared to the configuration in which the diffusion film BS912 is arranged.

Next, Table 2 illustrates evaluation results of the front surface brightness and unevenness in case where the angle θ formed between the direction of linearization by the fourth convex lenticular lens 14 to sixth convex lenticular lens 14 and the first direction is changed between 0 degree and 40 degrees.

With the configuration including the fourth convex lenticular lens 14, although unevenness of the brightness was results obtained when the angle θ was 10 degrees and 30 degrees, the front surface brightness was low. Even when the angle θ was 10 degrees, the front surface brightness was almost equal to the configuration using the conventional diffusion film. The configuration including the fifth convex lenticular lens 14 has a lens shape of a high front surface brightness when the angle θ is 0 degree, and the angle θ was 30 degrees when unevenness of the brightness is good. Although the brightness is high compared to a conventional configuration using the diffusion film, with the configuration having the first to the third convex lenticular lenses 14, the angle θ is about 10 degrees to 15 degrees and unevenness of the brightness is good, and therefore the brightness was comparatively low.

With the configuration having the sixth convex lenticular lens 14, unevenness of the brightness caused by the light deflection elements 18 could not be removed even by changing the angle θ.

Based on the above result, with the configuration in which the blurring structure 8 having the first to third convex lenticular lenses 14 is arranged, the display device 1 which provides a high brightness without producing unevenness of the brightness could be obtained. Further, the angle θ formed between the direction of linearization by the convex lenticular lenses 14 and the first direction is about 10 degrees to 15 degrees, so that the good display device 1 which does not distort the field of view could be obtained.

Further, although, with the configuration in which the blurring structure 8 having the fifth convex lenticular lens 14 is arranged, the display device 1 which has a high brightness compared to a conventional configuration without producing unevenness of the brightness was obtained, the brightness was low compared to the configuration having the first to third convex lenticular lenses 14.

The difference between blurring performances of the first convex lenticular lens 14 and second convex lenticular lens 14 was tested.

The thickness t of the light guide body 7 used in the present example is 4 mm, and the refractive index $n_0$ is about 1.5. The light deflection elements 18 formed on the light deflection surface 17 are provided in two-dimensional alignment in which the light deflection elements 18 are aligned at the pitch $P_1$ of about 1.5 mm in the first direction and aligned at the pitch of $P_2$ of about 2.6 mm in the second direction, and are provided in hexagonal arrangement in which the shape connecting the adjacent light deflection elements 18 is nearly a regular triangle. Further, the average width D of the light deflection elements 18 near the light sources 6 is about 0.45 mm.

By contrast with this, the blurring structure 8 having the first and second convex lenticular lenses 14 is extruded and molded using polycarbonate resin having the refractive index of about 1.59. The maximum angle α of the first convex lenticular lens 14 is about 68 degrees, and the maximum angle α of the second convex lenticular lens 14 is about 58 degrees.

The linearization effects of the first and second convex lenticular lenses 14 will be tested using equation 9 to equation 12 and FIG. 18. That is, lights of the light deflection elements 18 adjacent in the first direction illustrated in FIG. 18 are linearized inclining at the angle θ with respect to the first direction, and the distance b between these two linear lights M, and the distance c between two long linear lights $N_6$ in case where the linear lights M inclined at the angle θ are aligned in the first direction and a pseudo assumption is made that the long linear lights $N_6$ having the width Y in the second direction are aligned at the pitch $P_2/2$ in the second direction are calculated. This result is illustrated in Table 3.

TABLE 3

| Angle θ [deg] | b[mm] | c[mm] α = 68 degrees | c[mm] α = 58 degrees |
|---|---|---|---|
| 0 | −0.45 | 0.85 | 0.85 |
| 1 | −0.42 | 0.75 | 0.78 |
| 2 | −0.40 | 0.66 | 0.70 |
| 3 | −0.37 | 0.56 | 0.63 |
| 4 | −0.35 | 0.46 | 0.56 |
| 5 | −0.32 | 0.37 | 0.49 |
| 6 | −0.29 | 0.27 | 0.42 |
| 7 | −0.27 | 0.18 | 0.34 |
| 8 | −0.24 | 0.08 | 0.27 |
| 9 | −0.22 | −0.01 | 0.20 |
| 10 | −0.19 | −0.11 | 0.13 |
| 11 | −0.16 | −0.20 | 0.06 |
| 12 | −0.14 | −0.30 | −0.01 |
| 13 | −0.11 | −0.39 | −0.08 |
| 14 | −0.09 | −0.48 | −0.16 |
| 15 | −0.06 | −0.58 | −0.23 |
| 16 | −0.04 | −0.67 | −0.30 |
| 17 | −0.01 | −0.76 | −0.36 |
| 18 | 0.01 | −0.85 | −0.43 |
| 19 | 0.04 | −0.94 | −0.50 |
| 20 | 0.06 | −1.04 | −0.57 |
| 21 | 0.09 | −1.13 | −0.64 |
| 22 | 0.11 | −1.21 | −0.71 |

The distance b between the two adjacent linear lights calculated according to equation 9 completely overlaps the width of the light deflection elements 18 when the angle θ is 0 degree, and takes a value of −D. When the angle θ becomes greater, the value of b becomes greater and becomes 0 when the angle θ is 16 degrees. Further, when the angle θ is 20 degrees, the interval of 0.1 mm is provided, and therefore unevenness of the brightness is seen.

By contrast with this, the distance c which is calculated according to equation 10 between adjacent long linear lights $N_6$ having the width Y in the second direction changes based on the maximum angle α of the convex lenticular lenses 14, so that this is the difference between blurring performances of the first convex lenticular lens 14 and second convex lenticular lens 14. That is, as illustrated in Table 3, in case of the first convex lenticular lens 14 having the maximum angle α of 68 degrees, the angle θ which holds equation 2 is 8 degrees or more and, incase of the second convex lenticular lens 14 having the maximum angle α of the 58 degrees, the angle θ which holds equation 10 is 11 degrees or more.

Consequently, with the configuration having the first convex lenticular lens 14 having the maximum angle α of 68 degrees, the condition which satisfies both of equation 9 and equation 10 is that the angle θ is in the range equal to or more than 8 degrees and equal to or less than 16 degrees, and, by contrast with this, with the configuration having the second convex lenticular lens 14 having the maximum angle α of 58 degrees, the angle θ is in the range equal to or more than 11 degrees and equal to or less than 16 degrees.

Although blurring performance for the light deflection elements 18 at the maximum angle α of the convex lenticular lenses 14 has been described, the parameter of the convex lenticular lenses 14 which is effective to blurring performance is not the maximum α alone. As described, it is important to make an optimal lens shape including the top fitting curvature radius $RL_1$, height $TL_1$ and change rate of the tangent line at each point on the sectional shape of the convex lenticular lenses 14.

Father, although, with the example, the optical angle θ is calculated according to the condition of the light guide body 7 used and the light deflection elements 18 formed on the light deflection elements 17 of the light guide body 7, it naturally follows that, when the light guide body 7 or light deflection elements 18 change, the optical angle θ also changes. The inventors of the present invention evaluated unevenness of the brightness and front surface brightness of the display device 1 using a plurality of light guide bodies 7 in addition to the light guide body 7 used with this example. When the thickness of the light guide body 7 is 4 mm, the pitch $P_1$ in the first direction is about 1.1 mm, the pitch $P_2$ is about 1.9 mm, and the width D of the light deflection elements 18 is about 0.45 mm, if the blurring structure 8 in which the maximum angle α of the convex lenticular lenses 14 is 68 degrees is used, the display device 1 was obtained in which the angle θ formed between the linear lights and the first direction is 5 degrees or more, and provides a high brightness without unevenness of the brightness.

Thus, it is possible to provide the illuminating device 3 and the display device 1 having the illuminating device 3 which has the convex lenticular lenses 14 which provide the angle θ satisfying equation 9 to equation 12 even if the parameters of the light guide body 7 change as described above and increase blurring performance and light condensing performance, and which provides a high brightness without unevenness of the brightness by using the optical split structure 20 and diffusing optical sheet 28 in combination.

What is claimed is:
1. An illuminating device comprising at least:
   a light source;
   a light guide body which includes an incidence surface on which light emitted from the light source is incident, an emission surface which emits the incident light toward a viewer and, a light deflection surface which guides the incident light to the emission surface;
   a reflection sheet which reflects the light emitted from a surface on a side opposite to the emission surface to guide to the light guide body; and
   a blurring structure, wherein
   the light deflection surface includes light deflection elements which guide light incident on the light guide body toward the emission surface,
   the light deflection elements are arranged in two-dimensional alignment by aligning the light deflection elements at nearly equal intervals of a first pitch $P_1$ in a first direction, and at nearly equal intervals of a second pitch $P_2$ in a second direction nearly orthogonal to the first direction, the blurring structure includes a first primary surface and a second primary surface, the first primary surface includes linear lenses aligned in at least one direction, a direction in which the first linear lenses extend is arranged inclining in a range equal to or more than 5 degrees and equal to or less than 45 degrees with respect to a random direction X, and the direction X matches with one of the first direction and the second direction.

2. The illuminating device according to claim 1, wherein the direction X matches with the second direction, and an angle $\theta_1$ formed between a direction in which the first linear lenses extend and the direction X is defined according to following equation 1

$$\theta_1 = \tan^{-1}\left(\frac{P_2}{3*P_1}\right) \pm 10[deg]. \quad \text{(Equation 1)}$$

3. The illuminating device according to claim 2, wherein the light guide body has a refractive index $n_0$ and a thickness t, the first linear lenses comprise a convex lenticular lens shape has a refractive index $n_1$ and comprises a top of a round sectional shape and a curved lateral surface, and an angle formed between a tangent line at an arbitrary point on the curved lateral surface and the first primary surface increases from the top to a first primary surface, a maximum angle $\alpha$ of the angle being defined according to following equation 2 where $\sin\theta_i$ is determined according to following equation 3 and equation 4

$$\alpha \geq \tan^{-1}\left\{\frac{\sin\theta_i}{\sqrt{n_1^2 - \sin^2\theta_i} - 1}\right\} \quad \text{(Equation 2)}$$

$$\sin\theta_i = n_0\sin\left(\tan^{-1}\left(\frac{r_1}{2t}\right)\right) \quad \text{(Equation 3)}$$

$$r_1 = \frac{3*P_1}{2*\cos\theta_1}. \quad \text{(Equation 4)}$$

4. The illuminating device according to claim 1, wherein the direction X matches with the first direction, and an angle $\theta_2$ formed between a direction in which the linear lenses extend and the direction X is defined according to following equation 5

$$\theta_2 = \tan^{-1}\left(\frac{P_1}{3*P_2}\right) \pm 10[deg]. \quad \text{(Equation 5)}$$

5. The illuminating device according to claim 4, wherein the light guide body has a refractive index $n_0$ and a thickness t, the first linear lenses comprise a convex lenticular lens shape has a refractive index $n_1$ and comprises a top of a round sectional shape and a curved lateral surface, and an angle formed between a tangent line at an arbitrary point on the curved lateral surface and the first primary surface increases from the top toward the primary surface, a maximum angle $\alpha$ of the angle being defined according to following equation 6 where $\sin\theta_i$ is defined according to following equation 7 and equation 8

$$\alpha \geq \tan^{-1}\left\{\frac{\sin\theta_i}{\sqrt{n_1^2 - \sin^2\theta_i} - 1}\right\} \quad \text{(Equation 6)}$$

$$\sin\theta_i = n_0\sin\left(\tan^{-1}\left(\frac{r_2}{2t}\right)\right) \quad \text{(Equation 7)}$$

$$r_2 = \frac{3*P_2}{2*\cos\theta_2}. \quad \text{(Equation 8)}$$

6. The illuminating device according to claim 1, wherein the blurring structure comprises a convex curved shape in which a sectional shape in an alignment direction of the linear lenses comprises a round top and a curved line going from the top to the first primary surface, and in which an angle formed between a tangent line at an arbitrary point on the sectional shape and the first primary surface increases from the top to the first primary surface, the linear lenses convert and linearly emit part of light emitted from the emission surface in a normal direction of the first primary surface along a direction of an angle $\theta$ with respect to the first direction, the linear lenses have a refractive index $n_1$ and comprise a maximum angle $\alpha$ formed between a tangent line at each point on the sectional shape and the first primary surface, the light guide body has a thickness t and a refractive index $n_0$, and when a light deflection element, among the light deflection elements, is arranged near the light source and comprises an average diameter or a width D, following equation 9 and equation 10 are satisfied, a variable L shown in equation 10 is determined according to equation 11, and an angle $\theta_i$ described in equation 11 and the maximum angle $\alpha$ of the linear lenses holds a relationship of equation 12

$$P_1 * \sin\theta - D \leq 0[mm] \quad \text{(Equation 9)}$$

$$0.5 * P_2 - 2 * L * \sin\theta - D \leq 0.1[mm] \quad \text{(Equation 10)}$$

$$L = t * \tan(\sin^{-1}(\sin\theta/n_0)) \quad \text{(Equation 11)}$$

$$\tan\alpha = \frac{\sin\theta_i}{\sqrt{n_1^2 - \sin^2\theta_i} - 1}. \quad \text{(Equation 12)}$$

7. The illuminating device according to claim 1, wherein the blurring structure is configured such that when a point light source which emits nearly Lambert light is arranged on a second primary surface side of the blurring structure such that a main axis of emission light and a normal direction of the second primary surface virtually match, light converted and emitted in the first primary surface among light incident from the second primary surface is converted into linear light which widens directly above around the point light source in an alignment direction of the linear lenses, and a peak brightness position of the linear light is directly above the point light source.

8. The illuminating device according to claim 1, wherein the blurring structure is configured such that when a point light source which emits nearly Lambert light is arranged on a second primary surface side of the blurring structure such that a main axis of emission light and a normal direction of the second primary surface virtually match, light converted and emitted from the first primary surface among light incident from the second primary surface is converted into linear light, and there is a peak brightness position of the linear light other than directly above the point light source, and when a brightness directly above the point light source is $L_0$ and a peak brightness is $L_1$, $L_1/L_0$ is 200% or less.

9. The illuminating device according to claim 1, wherein a sectional shape of the linear lenses is defined according to following equation 13, where equation 13 is an equation when a unit lens pitch of the linear lenses is normalized to 1, z is a position function in a height direction of the linear lenses and r is a width direction position variable of the linear lenses $$z = \frac{r^2/R}{1+\sqrt{1-(1+k)(r/R)^2}} + Ar^2 + Br^4 + Cr^6 \qquad \text{(Equation 13)}$$

where $-1 \le k \le 1$ $-10 < 1/R < 10$ $-5 < A < 5$ $-30 < B < 30$ $-30 < C < 30$.

10. The illuminating device according to claim 1, wherein $P_2/P_1$, which is a ratio of the first pitch $P_1$ and the second pitch $P_2$, is set to a range of $1.4 < P_2/P_1 < 2.2$.

11. The illuminating device according to claim 1, wherein $P_1/P_2$, which is a ratio of the first pitch $P_1$ and the second pitch $P_2$, is set to a range of $1.4 < P_1/P_2 < 2.2$.

12. The illuminating device according to claim 1, wherein the light deflection elements are arranged in two-dimensional alignment by aligning the light deflection elements at a n-fold of the first pitch $P_1$ in the first direction and aligned at a m-fold of the second $P_2$ in the second direction nearly orthogonal to the first direction, where n or m is selected from an integer between 1 and 10 at random.

13. The illuminating device according to claim 1, wherein the light deflection elements are provided in hexagonal arrangement in which a triangular shape drawn by connecting three adjacent light deflection elements is a nearly triangular shape, or are provided in arrangement in which arbitrary light deflection elements are removed from the hexagonal arrangement.

14. The illuminating device according to claim 1, further comprising a split structure on a first primary surface side of the blurring structure, wherein the split structure comprises a third primary surface and a fourth primary surface, and on the third primary surface, split lenses are aligned in at least one direction to convert and emit part of light incident from the fourth primary surface in a normal direction of the third primary surface and linearly or in a dot pattern along the second direction.

15. The illuminating device according to claim 1, further comprising a diffusing optical sheet comprising a Haze value equal to or more than 30% and equal to or less than 85% on a viewer side of the illuminating device.

16. A display device comprising:

the illuminating device according to claim 1; and an image display element which defines a display image.

17. A display device comprising:

the illuminating device according to claim 15; and an image display element which defines a display image, wherein the diffusing optical sheet comprises a polarizing separation reflection function.

18. The display device according to claim 16, wherein the image display element defines the display image by allowing or blocking transmission of light.

* * * * *